(12) United States Patent
Nozaki

(10) Patent No.: US 7,855,522 B2
(45) Date of Patent: Dec. 21, 2010

(54) MOTOR CONTROL METHOD AND MOTOR CONTROL APPARATUS

(75) Inventor: Mitsuhiro Nozaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 477 days.

(21) Appl. No.: 12/035,389

(22) Filed: Feb. 21, 2008

(65) Prior Publication Data
US 2008/0203957 A1 Aug. 28, 2008

(30) Foreign Application Priority Data
Feb. 27, 2007 (JP) ............................. 2007-047353

(51) Int. Cl.
*H02P 1/00* (2006.01)

(52) U.S. Cl. .................. 318/268; 318/278; 318/400.13; 318/603; 318/615

(58) Field of Classification Search ................. 318/257, 318/268, 278, 162, 163, 601, 603, 604, 606, 318/607, 615, 616, 632, 100.12, 400.13
See application file for complete search history.

(56) References Cited

U.S. PATENT DOCUMENTS

| | | | | |
|---|---|---|---|---|
| 4,147,967 A | * | 4/1979 | Aiena | ......................... 388/811 |
| 4,353,020 A | * | 10/1982 | Veale | ......................... 318/601 |
| 5,223,774 A | * | 6/1993 | Ikeda et al. | .................. 318/268 |
| 6,111,384 A | * | 8/2000 | Stagnitto | ..................... 318/602 |
| 6,831,431 B1 | * | 12/2004 | Dieterle et al. | .............. 318/268 |
| 7,230,401 B2 | * | 6/2007 | Muroi et al. | ................. 318/466 |

FOREIGN PATENT DOCUMENTS

| | | |
|---|---|---|
| JP | 2001296148 A | 10/2001 |
| JP | 2006056623 A | 3/2006 |
| JP | 2006159510 A | 6/2006 |

* cited by examiner

*Primary Examiner*—Walter Benson
*Assistant Examiner*—Thai Dinh
(74) *Attorney, Agent, or Firm*—Baker Botts L.L.P.

(57) ABSTRACT

A motor control method includes the steps of: measuring a time period from an output of a drive detection signal to a next output of a drive detection signal; storing the measurement result at each time of output of a drive detection signal as a measured cycle; calculating a driven velocity of the driven object based on the stored measured cycle; calculating an operation amount of the motor such that the calculated driven velocity is equal to a predetermined target velocity. In the motor control method, it is determined, at each calculation timing, whether or not the driven object is in a low velocity state where an actual velocity is lower than the target velocity. When determined affirmative, calculation of the driven velocity of the driven object is performed based on a measured value being currently measured at the calculation timing in place of the stored measured cycle.

10 Claims, 20 Drawing Sheets

MOTOR CONTROL METHOD AND MOTOR CONTROL APPARATUS

CROSS-REFERENCE TO RELATED APPLICATIONS

This application claims the benefit of Japanese Patent Application No. 2007-47353 filed Feb. 27, 2007 in Japan Patent Office, the disclosure of which is incorporated herein by reference.

BACKGROUND

This invention relates to a motor control method and a motor control apparatus in which a driven velocity of a driven object driven by a motor is calculated based on a detection signal from a drive detection device, such as an encoder which outputs a detection signal each time the driven object is driven by a specified amount, and driving of the motor is controlled such that the driven velocity is equal to a target velocity.

A known conventional image reading apparatus, such as an image scanner, includes an image sensor that reads an image formed on a document. The image sensor is usually mounted on a carriage disposed in a reciprocable manner along a guide shaft. While the carriage is driven by the motor (and thus the image sensor is driven), reading of an image by the image sensor is performed.

In the image reading apparatus of this type, it is necessary to drive the carriage at a constant velocity (a target velocity) during image reading by the image sensor in order to allow reading of an image in a highly accurate manner. By controlling the motor such that the carriage is driven at a constant target velocity and performing image reading of each line at a specified timing during the driving, reading of an image in a highly accurate manner can be achieved.

To drive-control the motor as described above, an encoder is usually used. The encoder generates a pulse signal each time the carriage as a driven object is moved by a specified amount (or a rotating shaft of the motor rotates by a specified amount). The motor is feedback-controlled such that a moving velocity of the carriage (i.e., a driven velocity of the driven object) calculated discretely based on the pulse signal outputted from the encoder is equal to a predetermined target velocity.

Specifically, in the above-mentioned feedback control, a time interval (hereinafter also referred to as an "edge cycle") between edges (rising edges or falling edges) of the pulse signal is measured and the driven velocity of the driven object is calculated based on the measured edge cycle. Then, an operation amount of the motor is calculated such that the driven velocity is equal to the target velocity at each calculation timing generated in a predetermined cycle, and the motor is drive-controlled in accordance with a calculation result (i.e., the calculated operation amount).

An explanation on calculation and output of an edge cycle will now be provided with reference to FIGS. 17 and 18. FIG. 17 shows a specific example of configuration for measuring an edge cycle. FIG. 18 is a time chart showing that an edge cycle at each calculation timing (at each calculation sampling pulse output) is used as a detection cycle for calculation during a constant velocity driving of the driven object.

As shown in FIGS. 17 and 18, when a pulse signal is outputted from the encoder, an edge pulse is generated at an edge timing (at an edge rising timing in this example) of the pulse signal, and the edge pulse is inputted to a cycle counter 201. The cycle counter 201 measures a time period (an edge cycle) from an input of an edge pulse to an input of a next edge pulse each time an edge pulse is inputted. The measurement is performed by counting a system clock inputted to the cycle counter 201. A measurement result by the cycle counter 201 at the time of input of an edge pulse is stored as an edge cycle in a memory 202.

As shown in FIG. 18, each time a calculation sampling pulse is outputted in a predetermined cycle (i.e., at each calculation timing), an edge cycle stored in the memory 202 at the each calculation timing is used for calculation of a driven velocity or the like (and thus for feedback-control of the motor) as a detection cycle for calculation.

For example, as shown in FIG. 18, at the time of a calculation sampling pulse output at a time t1, a value "a" of the cycle counter at the time of an immediately previous output of an edge pulse is stored in the memory 202 as the edge cycle. Accordingly, the edge cycle "a" is used for calculation of the driven velocity or the like, as the detection cycle for calculation. Also, at the time of a calculation sampling pulse output at each of times t2, t3 and t4, each of respective edge cycles c, e and g stored in the memory 202 at each calculation timing is used for calculation or the like, as the detection cycle for calculation.

SUMMARY

However, in a case of feedback-controlling a motor as described above, a load applied to the motor is not always constant and may be changed due to uncertain changing factors. The changing factors include friction and assembly variation of a drive system, and a grease application state and an attaching state of fine foreign substances to a slidable contact portion of a driven object (a slidable contact portion of the carriage with the guide shaft in the above example). Accordingly, especially when the motor is driven at a lower velocity, the rotating velocity of the motor may be temporarily rapidly lowered or stopped in some cases due to, for example, a change in load applied to the motor.

In the case of feedback-controlling a motor as described above, a detection cycle for calculation is updated and a calculation result of the driven velocity is also updated at each edge rising timing of a pulse signal outputted from an encoder (i.e., at each edge pulse input timing). Accordingly, as shown in FIG. 19, in a period, for example, from when the detection cycle for calculation is updated at the calculation timing at the time t1 to "a" which is a stored value at the time in the memory 202 (and the driven velocity is also updated) until the next calculation timing at the time t2, the motor is driven in accordance with the operation amount calculated based on the updated driven velocity. At the calculation timing at the time t2, the detection cycle for calculation is again updated to "c" which is a stored value at the time in the memory 202, and thus the driven velocity and the operation amount are also updated.

As exemplarily shown by FIG. 19, the driven object is driven at a constant velocity until a timing when the edge cycle "c" is stored in the memory 202 (until an edge pulse output timing immediately before the time t2). Once the driven object is rapidly slowed down due to a subsequent change (an increase) in load, a next edge pulse is not inputted or the edge cycle to be stored in the memory 202 is not updated either for a long period of time. In this case, it is required to increase the operation amount of the motor so as to return the driven velocity of the driven object to the original constant velocity (i.e., the target velocity).

However, when the next calculation timing t3 has arrived before the next edge pulse is inputted due to the delay caused by the rapid slow down, both the driven velocity and the operation amount are calculated based on the edge cycle "c" currently stored in the memory 202 (the same as the edge cycle stored at the time t2) also at the calculation timing at the time t3.

The driven velocity calculated based on the edge cycle "c" at the time t3 is obviously higher than an actual velocity of the driven object which has been rapidly slowed down. Accordingly, it is determined in a control system that the driven object is driven at a normal velocity despite the actual rapid slow down, and thus the operation amount of the motor is not increased.

FIGS. 20A, 20B and 20C show changes (in an experimental example) in velocity, encoder count value (a count value of edge pulses) and operation amount in a case of controlling drive of the driven object at a constant velocity by the motor. In FIG. 20 A, a frequency of an edge pulse indirectly indicating a velocity is used as the velocity of the driven object. As shown in the figures, even when the driven object is rapidly slowed down due to a change (an increase) in load applied to the motor or the like, information of the rapid slow down is not immediately reflected to the control system. Accordingly, the velocity which has been rapidly slowed down cannot easily be returned to the original constant velocity.

Referring to FIGS. 20A to 20C, for example, the driven object is rapidly slowed down at a time point of 1.6 sec. (see 1.6 sec. to 1.8 sec. in FIG. 20B). It is, therefore, necessary to increase the operation amount in order to return the velocity of the driven object to the original velocity. However, the rapid slow down cannot be recognized by the control system unless the edge cycle stored in the memory 202 is updated, and the driven velocity is calculated based on the edge cycle stored in the memory 202 at the calculation timing. Accordingly, the rapid slow down is not immediately reflected to the calculation result of the driven velocity (see 1.6 sec. to 1.8 sec. in FIG. 20A). Thus, the operation amount, which should be increased, is decreased instead (see 1.6 sec. to 1.8 sec. in FIG. 20C), and recovery of the driven velocity is substantially delayed.

It is, therefore, desirable to provide a method in which a velocity of a motor may be rapidly returned to a target velocity during a feedback control of the motor based on an output pulse (a detection signal) from a drive detection device, such as an encoder, even when the motor is rapidly slowed down due to, for example, a change in load on the motor, and a detection signal is not outputted from the drive detection device for a long time period.

In one aspect of the present invention, a motor control method includes the steps of: measuring a time period from an output of a drive detection signal to a next output of a drive detection signal each time a drive detection signal is outputted from a drive detection device that outputs a drive detection signal each time a driven object is driven by a motor by a specified amount; storing the measurement result at the each time of output of a drive detection signal as a measured cycle each time a drive detection signal is outputted from the drive detection device; calculating a driven velocity of the driven object based on the stored measured cycle; calculating an operation amount of the motor such that the calculated driven velocity is equal to a predetermined target velocity at each calculation timing in a predetermined cycle; and drive-controlling the motor based on the calculation result of the operation amount.

In the motor control method, it is determined, at the each calculation timing, whether or not the driven object is in a low velocity state where an actual velocity is lower than the target velocity. When it is determined that the driven object is in the low velocity state, calculation of the driven velocity of the driven object is performed based on a measured value being currently measured at the calculation timing in place of the stored measured cycle.

According to the motor control method, each time a drive detection signal is outputted from the drive detection device, the measurement result at the time is stored (updated) as the measured cycle, and the driven velocity of the driven object is calculated based on the latest stored measured cycle. Then, the operation amount is calculated based on the driven velocity (a calculated value) at the each calculation timing. At the each calculation timing, when the driven object is in a low velocity state where the actual velocity is lower than the target velocity, calculation of the driven velocity of the driven object is performed based on a measured value being currently measured at the calculation timing in place of the stored measured cycle.

In a case where calculation of the operation amount is performed based on the driven velocity calculated from the stored measured cycle although the driven object is in the low velocity state where the actual velocity is lower than the target velocity, the operation amount may not be increased and thus recovery from the low velocity state to the target velocity may be delayed (or the driven object may be stopped in some cases). To avoid this, when the driven object is in the low velocity state, the driven velocity is calculated based on the measured value being currently measured (i.e., the value to which the actual velocity lower than the target velocity is reflected), and in turn calculation of the operation amount is performed based on the driven velocity calculated as above.

According to the motor control method of the present invention, therefore, the velocity of the motor may be rapidly returned to the target velocity even when the motor (the driven object) is rapidly slowed down due to, for example, a change in load on the motor and a detection signal is not outputted from the drive detection device for a long time period.

BRIEF DESCRIPTION OF THE DRAWINGS

The invention will now be described below, by way of example, with reference to the accompanying drawings, in which.

DETAILED DESCRIPTION OF THE PREFERRED EMBODIMENT

First Embodiment

[1] General Configuration of Multifunction Apparatus

Figure 1:
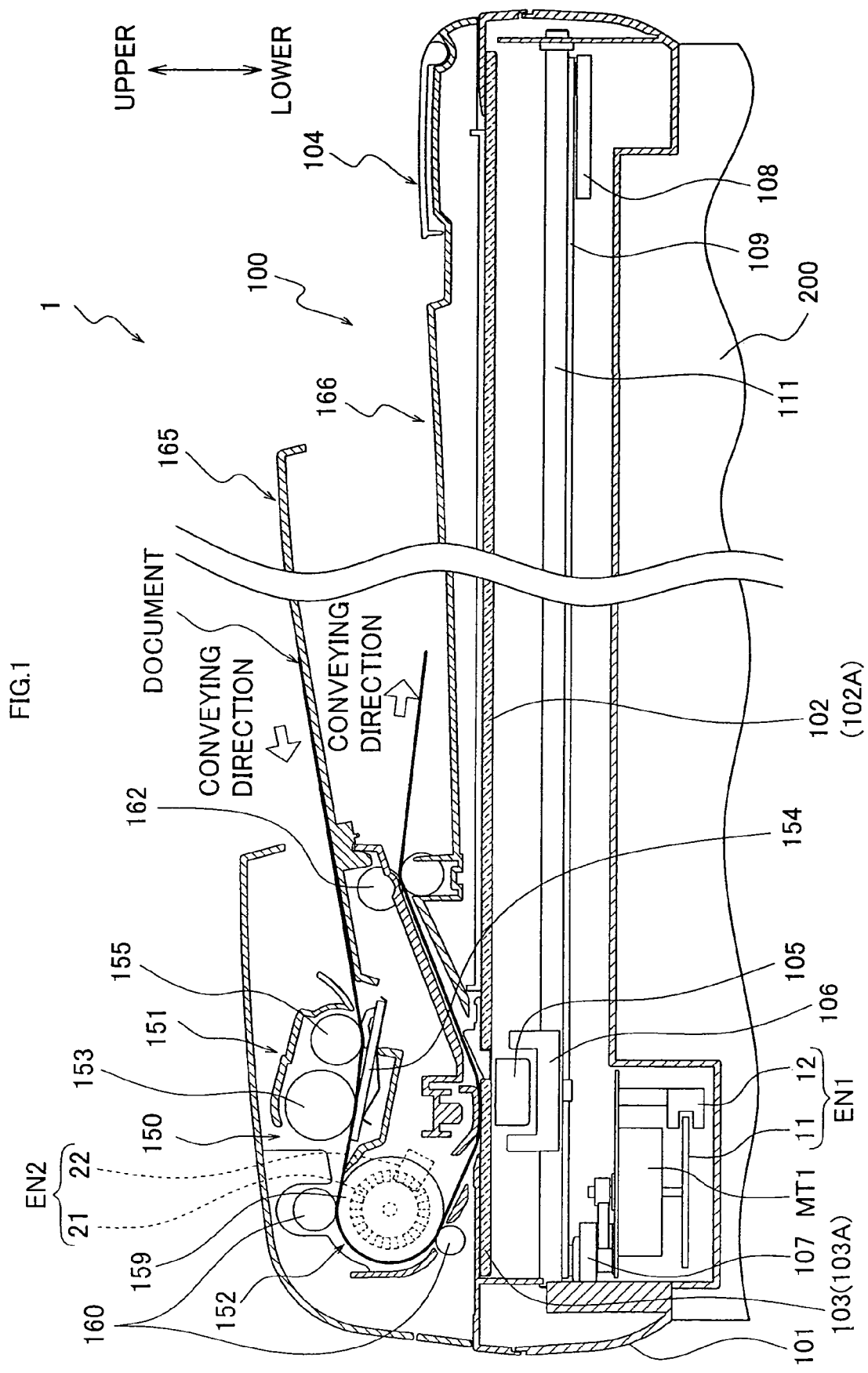
FIG. 1 is a cross-sectional view of a multifunction apparatus in a first embodiment.

A multifunction apparatus 1 in a first embodiment of the present invention includes an image reading apparatus (a scanner) for reading an image formed on a document and an image forming apparatus, such as a printer, integrated with each other. The multifunction apparatus 1 also has a copier function, a facsimile function, etc. Specifically, as shown in FIG. 1, an image reading apparatus 100 is disposed in an upper portion and an electrophotographic image forming apparatus 200 is disposed in a lower portion in the multifunction apparatus 1. An operation panel (not shown) for setting operation of the multifunction apparatus 1 is provided on an upper front side (on a near side in a direction perpendicular to a paper plane of FIG. 1) of the multifunction apparatus 1.

The image forming apparatus 200 is used for forming an image on a recording sheet to achieve a printer function, a copier function and a facsimile function. The image reading apparatus 100 is used for reading an image on a document to achieve a scanner function, a copier function and a facsimile function.

The image reading apparatus 100 included in the multifunction apparatus 1 of the present embodiment is provided with both an automatic conveyance and reading function and a stationary document reading function. The automatic conveyance and reading function is a function to read an image formed on a document with a reading unit (the after-mentioned CIS 105) while automatically conveying the document. The stationary document reading function is a function to read an image formed on a stationarily placed document while conveying (moving) the reading unit in a sub scanning direction along the document.

[2] Schematic Configuration of Image Reading Apparatus

As shown in FIG. 1, an image reading window (hereinafter referred to as a "stationary reading window") 102 for the stationary document reading function and an image reading window (hereinafter referred to as an "automatic reading window") 103 for the automatic conveyance and reading function are provided in a main body portion 101 of the image reading apparatus 100. The image reading windows 102 and 103 are closed by respective transparent platens 102A and 103A made of glass, acryl or the like.

A document cover 104 which covers both the image reading windows 102 and 103 is pivotably assembled to an upper surface side of the main body portion 101. When document reading is performed through the stationary reading window 102, the document cover 104 is manually opened upward, and a document is placed on the stationary reading window 102.

In the main body portion 101, a CIS (Contact Image Sensor) 105 is disposed as a reading unit that reads an image on a document line by line and outputs a reading result (i.e., pixel signals). The CIS 105 reads the image, such as characters or letters, formed on the document by converting the image into pixel signals. An imaging device, an LED and a lens (any of them not shown) constituting the CIS 105 are disposed in a linear arrangement in a direction (a direction perpendicular to the paper plane of FIG. 1) perpendicular to a moving direction (a right and left direction in FIG. 1) of the CIS 105. This allows reading of an image for one line in a main scanning direction at one time.

The CIS 105 is assembled to the main body portion 101 through a carriage 106 so as to be movable in a longitudinal direction (in the right and left direction in FIG. 1) of the main body portion 101. The CIS 105 is stationarily positioned right under the automatic reading window 103 when the automatic conveyance and reading function is in operation, and reads an image. In contrast, when the stationary document reading function is in operation, the CIS 105 reads an image while being moved right under the stationary reading window 102.

In the present embodiment, the carriage 106 is connected to a belt 109 wound around a driving pulley 107 and a driven pulley 108. When the belt 109 is rotated by a reading motor MT1, the carriage 106 (and thus the CIS 105) is moved while being guided by a guide shaft 111. The reading motor MT1 in the present embodiment is a DC motor.

When the stationary document reading function is in operation, the CIS 105 reads an image formed on a document while being moved at a constant velocity by the reading motor MT1 from a specific document placement reference position as a starting point in a direction (hereinafter also referred to as "a forward direction") of scanning (sub scanning) the document. After the reading is completed, the CIS 105 is moved in a reverse direction by the reading motor MT1 to return to the document placement reference position.

The reading motor MT1 is provided with a reading encoder EN1 (an optical rotary encoder) which outputs a pulse signal each time the reading motor MT1 rotates by a predetermined amount (and thus each time the CIS 105 is moved by a predetermined amount). Movement of the CIS 105 is controlled based on the pulse signal from the reading encoder EN1.

The reading encoder EN1 includes a rotary slit disk 11 with encoder slits formed at predetermined intervals in a circumferential direction and a detection unit 12 for detecting a rotating amount and a rotating direction of the rotary slit disk 11. The rotary slit disk 11 is provided coaxially with a rotating shaft (an output shaft) of the reading motor MT1 and is rotated accompanying rotation of the reading motor MT1.

The detection unit 12 including a light emitting element and a light receiving element (any of the elements not shown) is disposed such that a slit-formed portion of the rotary slit disk 11 is located between the two elements. The detection unit 12 outputs two types of signals (an A-phase signal and a B-phase signal) with a specified cycle shifted from each other (¼ cycle in the present embodiment) in accordance with rotation of the reading motor MT1. The A-phase signal and the B-phase signal are such that, when the moving direction of the carriage 106 is the forward direction, the A-phase signal is advanced in phase by a specified cycle from the B-phase signal, and when the moving direction of the carriage 106 is the reverse direction, the A-phase signal is delayed in phase by a specified cycle from the B-phase signal.

An automatic document feeder apparatus (hereinafter referred to as an "ADF apparatus") 150 for conveying a reading target document to the automatic reading window 103 is provided in a portion of the document cover 104 corresponding to the automatic reading window 103 and a vicinity of the portion. The ADF apparatus 150, which conveys a document for automatic reading placed on the document tray 165 to the automatic reading window 103, includes a separation mechanism 151, a conveyance mechanism 152, a sheet discharge roller 162, etc. The separation mechanism 151 separates stacked sheets of document sheet by sheet. The conveyance mechanism 152 conveys the sheets of document separated by the separation mechanism 151 to the automatic reading window 103. The sheet discharge roller 162 discharges the sheets of document after completion of image reading to a discharge tray 166.

The separation mechanism 151 includes a separation roller 153, a separation pad 154, and a pulling roller 155. The pulling roller 155 feeds sheets of document stacked on the document tray 165 in a pulling manner to the separation roller 153. The separation roller 153 applies a conveying force to a uppermost sheet of a plurality of sheets of document stacked in an upper and lower direction. The separation pad 154 is disposed so as to face the separation roller 153, contact the sheet from a side opposite to the separation roller 153 and exert a predetermined conveyance resistance to the sheet.

The conveyance mechanism 152 includes a sheet feed roller 159 and a pair of pinch rollers 160. The sheet feed roller 159 applies a conveying force while turning a conveying direction of the sheet separated and conveyed from the separation mechanism 151 toward the automatic reading window 103. The pinch rollers 160 press the sheet against the sheet feed roller 159.

These rollers constituting the ADF apparatus 150 rotate in accordance with a rotary driving force of a reading conveyance motor (not shown) thereby to convey the sheet from the document tray 165 to the sheet discharge tray 166. The reading conveyance motor in the present embodiment is also a DC motor.

When the automatic conveyance and reading function is in operation, the CIS 105 is stationarily located right under the automatic reading window 103 and reads an image formed on the sheet conveyed at a constant velocity by the ADF apparatus 150. Then, the sheet after completion of image reading is discharged.

As shown in FIG. 1, a reading conveyance encoder EN2 (an optical rotary encoder) is provided to the reading conveyance motor and generates a pulse signal each time the reading conveyance motor rotates by a predetermined amount (and thus each time the sheet is conveyed by a predetermined amount).

The reading conveyance encoder EN2 has substantially the same configuration as the reading encoder EN1. Specifically, the reading conveyance encoder EN2 includes a rotary slit disk 21 with encoder slits formed at predetermined intervals in a circumferential direction and a detection unit 22 for detecting a rotating amount and a rotating direction of the rotary slit disk 21. The rotary slit disk 21 is provided coaxially with a rotating shaft (an output shaft) of the reading conveyance motor and is rotated accompanying rotation of the reading conveyance motor. Conveyance of a document is controlled based on pulse signals (an A-phase signal and a B-phase signal) outputted from the detection unit 22 in accordance with the rotation of the reading conveyance motor.

[3] Electrical Configuration of Image Forming Apparatus

Figure 2:
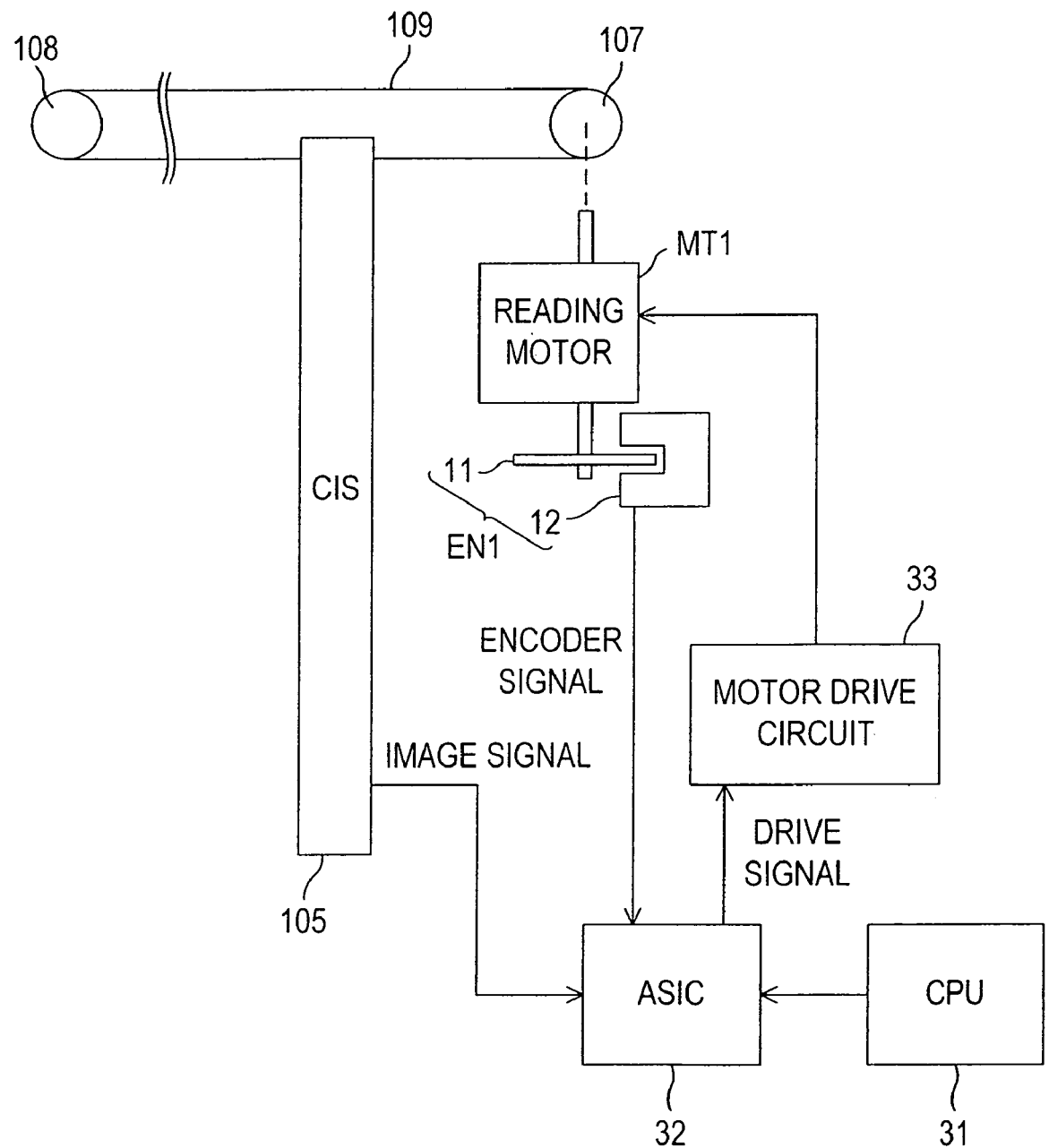
FIG. 2 is an explanatory view showing a schematic configuration of an image reading apparatus provided in the multifunction apparatus in the first embodiment.
Figure 3:
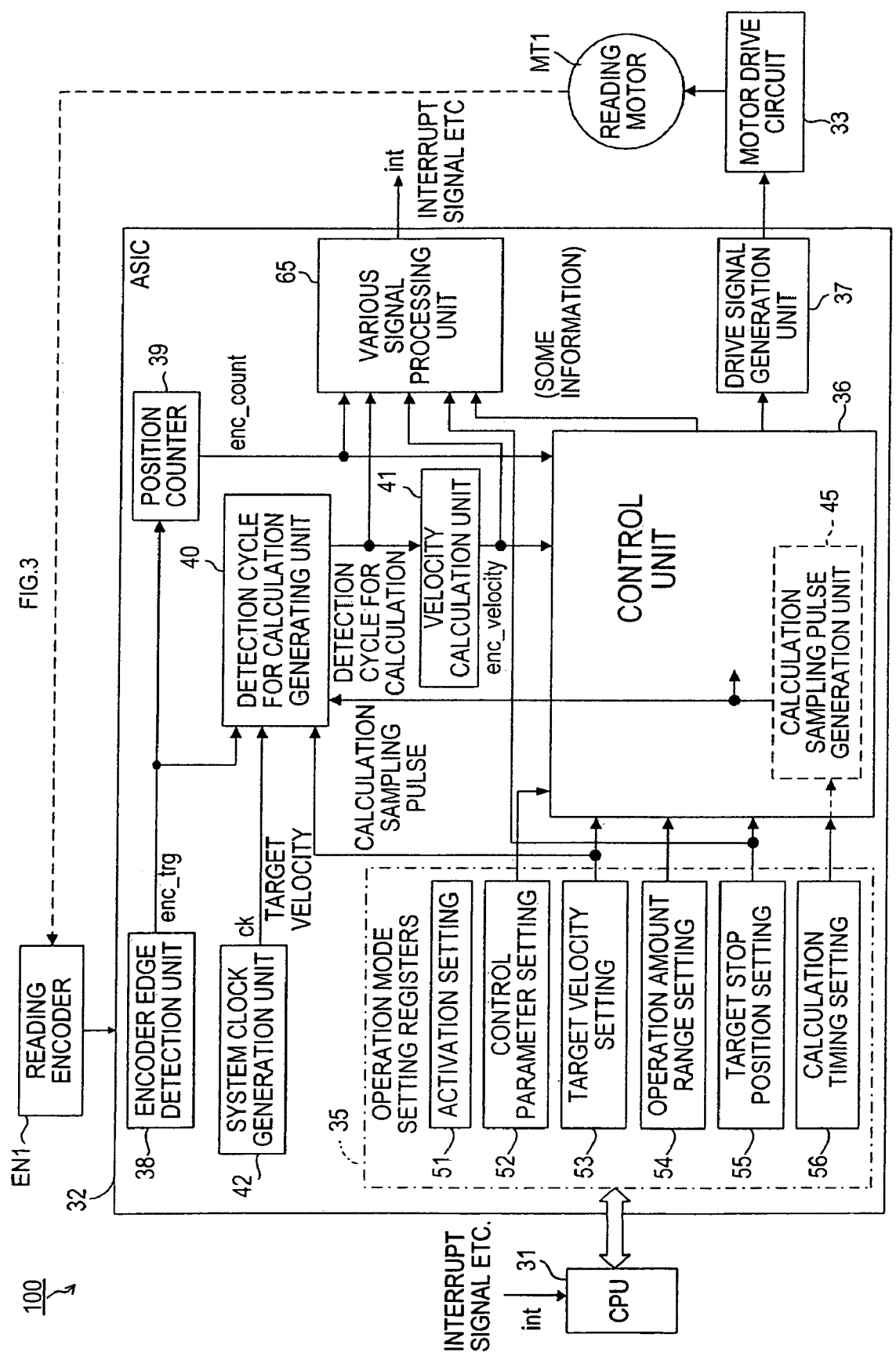
FIG. 3 is a block diagram showing a schematic electrical configuration of the image reading apparatus provided in the multifunction apparatus in the first embodiment.

An explanation will now be provided on a configuration of the image reading apparatus 100 included in the multifunction apparatus 1 of the present embodiment with reference to FIG. 2 and FIG. 3. FIG. 2 is an explanatory view showing a schematic configuration of a mechanism specifically for controlling the drive of the reading motor MT1 (and thus controlling the drive of the carriage 106) in the image reading apparatus 100. FIG. 3 is a block diagram showing an electrical configuration of the mechanism. In FIG. 2, the carriage 106 on which the CIS 105 is mounted, the guide shaft 111, and the like (see FIG. 1), are omitted.

As shown in FIG. 2, a reading motor drive control mechanism in the image reading apparatus 100 of the present embodiment includes a CPU 31, an ASIC (Application Specific Integrated Circuit) 32 and a motor drive circuit 33. The CPU 31 controls an entire drive control system. The ASIC 32 generates a drive signal for controlling the drive of the reading motor MT1 based on an encoder signal (a pulse signal) from the reading encoder EN1 for detecting a rotating amount of the reading motor MT1 (and thus detecting a moving amount of the carriage 106 on which the CIS 105 is mounted), and on a control command from the CPU 31. The motor drive circuit 33 drives the reading motor MT1 based on the drive signal.

Although the ASIC 32 receives an input of an image signal as a result of image reading by the CIS 105, as shown in FIG. 2, and performs various image processings based on the image signal, a detailed explanation of the image processings is omitted here.

A detailed explanation of the drive control of the reading motor MT1 will now be provided with reference to FIG. 3. As described above with reference to FIG. 2, the drive control of the reading motor MT1 is performed mainly by the CPU 31, the ASIC 32, the motor drive circuit 33 and the reading encoder EN1, and thereby the drive of the carriage 106 (the drive of the CIS 105) is controlled.

The motor drive circuit 33 includes a known H-bridge circuit constituted by four switching devices (for example, devices constituted by FETs: Field Effect Transistors) and flywheel diodes connected in parallel with the respective switching devices. The motor drive circuit 33 turns on and off the switching devices in response to an external drive signal (a PWM signal) to thereby control conduction to the reading motor MT1.

The ASIC 32 includes therein a group of operation mode setting registers 35. Various parameters, and the like, required for drive control of the reading motor MT1 are stored in the group of operation mode setting registers 35 by an operation of the CPU 31.

The group of operation mode setting registers 35 include an activation setting register 51, a control parameter setting register 52, a target velocity setting register 53, an operation amount range setting register 54, a target stop position setting register 55 and a calculation timing setting register 56, etc.

The activation setting register 51 is provided for activating the reading motor MT1. The control parameter setting register 52 is provided for setting various control parameters used for various control calculation in a control unit 36. Target velocity setting register 53 is provided for setting a target velocity of the carriage 106. The operation amount range setting register 54 is provided for setting an upper limit and a lower limit of the operation amount calculated in the control unit 36. The target stop position setting register 55 is provided for setting a target stop position of the carriage 106. The calculation timing setting register 56 is provided for setting a calculation timing at which the control unit 36 calculates the operation amount for controlling the reading motor MT1. Respective setting values are written to these registers by the CPU 31.

The calculation timing set in the calculation timing setting register 56 indicates a cycle in which a calculation sampling pulse generation unit 45 in the control unit 36 generates and outputs calculation sampling pulses. The calculation sampling pulse generation unit 45 sequentially generates and outputs calculation sampling pulses in the cycle indicated by the calculation timing set in the calculation timing setting register 56.

The control unit 36 performs calculation of the operation amount, or the like, as described later at each output timing of a calculation sampling pulse (i.e., at each calculation timing). The calculation sampling pulse is also outputted to a detection cycle for calculation generating unit 40 and is used as an output timing of a detection cycle for calculation as described later.

The ASIC 32 also includes, in addition to the group of operation mode setting registers 35, a system clock generation unit 42, an encoder edge detection unit 38, a position counter 39, the detection cycle for calculation generating unit 40, a velocity calculation unit 41, the control unit 36, a drive signal generation unit 37 and a various-signal processing unit 65.

The system clock generation unit 42 generates a system clock ck having a cycle sufficiently shorter than a cycle of the pulse signal from the reading encoder EN1 and provides the system clock ck to each component in the ASIC 32.

The encoder edge detection unit 38, the position counter 39 and the velocity calculation unit 41 are provided for detecting a position and a moving velocity of the carriage 106 based on the pulse signals from the reading encoder EN1.

The control unit 36 calculates the operation amount (a PWM duty ratio) of the reading motor MT1 based on detection results by the position counter 39 and the velocity calculation unit 41, the parameters set in the group of operation mode setting registers 35, etc. The drive signal generation unit 37 generates a drive signal (a PWM signal) for duty driving of the reading motor MT1 based on the operation amount calculated by the control unit 36, and outputs the drive signal to the drive circuit 33. The various-signal processing unit 65 processes various signals generated in the ASIC 32, and outputs the processed signals to the CPU 31.

The encoder edge detection unit 38 receives an A-phase encoder signal and a B-phase encoder signal, and detects edges of the A-phase signal indicating a start and an end of each cycle and a rotating direction of the reading motor MT1. The encoder edge detection unit 38 outputs an edge pulse (enc_trg) which is synchronized with a rising edge detection timing of the A-phase signal from the reading encoder EN1 to the position counter 39 and the detection cycle for calculation generating unit 40.

The position counter 39 counts up or counts down a position count value (enc_count) by a number of edge pulses (enc_trg) in accordance with the rotating direction of the reading motor MT1 (and thus a moving direction of the carriage 106) detected by the encoder edge detection unit 38, to thereby detect a moving amount (or position) of the carriage 106. The position counter 39 outputs the position count value (enc_count) to the control unit 36 and the various-signal processing unit 65.

The detection cycle for calculation generating unit 40 basically measures a cycle (an edge cycle) in which an edge pulse is (enc_trg) inputted from the encoder edge detection unit 38, and stores and updates a measured edge cycle each time an edge pulse is inputted. At a timing of input of a calculation sampling pulse from the calculation sampling pulse generation unit 45, the detection cycle for calculation generating unit 40 outputs a currently stored edge cycle as a detection cycle for calculation. However, there is a case where the measured and stored edge cycle is not outputted as a detection cycle for calculation in the present embodiment. A detailed description of such a case will be provided later.

In the velocity calculation unit 41, a moving velocity (enc_velocity) of the carriage 106 is calculated based on a physical resolution of the reading encoder EN1 and the detection cycle for calculation generated and outputted by the detection cycle for calculation generating unit 40.

The position count value (enc_count) from the position counter 39 and the moving velocity (enc_velocity) from the velocity calculation unit 41 are fed back to the control unit 36 as actual control amounts of a control target (the reading motor MT1 or the like) corresponding to an operation amount.

In the control unit 36, when an activation command to start the drive control of the reading motor MT1 is set in the activation setting register 51 by the CPU 31 as a result of start of image reading operation or the like, an operation amount of the reading motor MT1 is calculated based on parameters set in the respective registers 52 to 56, the position count value (enc_count) from the position counter 39 and the moving velocity (enc_velocity) from the velocity calculation unit 41.

Specifically, the control unit 36 calculates an operation amount to perform feedback control such that the moving velocity (enc_velocity) of the carriage 106 is equal to a target velocity set in the target velocity setting register 53 in synchronization with the calculation sampling pulse from the calculation sampling pulse generation unit 45. In the image reading apparatus 100, the drive control of the reading motor MT1 is performed based on the operation amount calculated as described above, and thus an image on a document is read while the CIS 105 mounted on the carriage 106 is moved at a constant velocity.

While performing feedback calculation of the operation amount as described above, the control unit 36, once the position of the carriage 106 obtained based on the position count value (enc_count) from the position counter 39 has reached a specified deceleration start position, calculates an operation amount required to stop the carriage 106 at a target stop position set in the target stop position setting register 55 at subsequent calculation timings.

An operation amount range set in the operation amount range setting register 54 is received by the control unit 36 and is used as an upper limit value for generating the operation amount of the reading motor MT1.

A specific configuration of the detection cycle for calculation generating unit 40 in the present embodiment will now be described with reference to FIG. 4.

Figure 4:
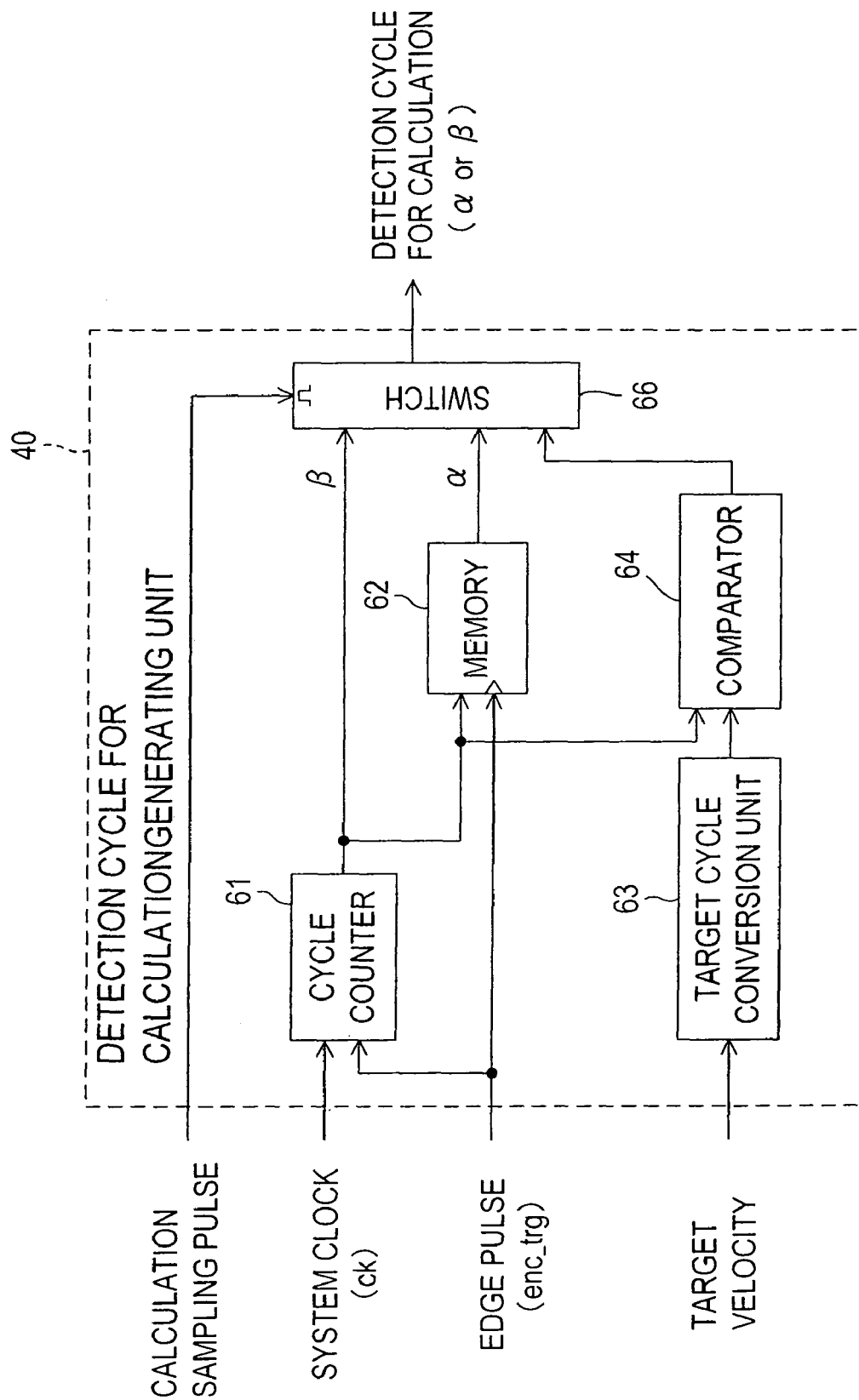
FIG. 4 is a block diagram showing a configuration of a detection cycle for calculation generating unit in the first embodiment.

As shown in FIG. 4, the detection cycle for calculation generating unit 40 in the present embodiment includes a cycle counter 61, a memory 62, a target cycle conversion unit 63, a comparator 64 and a switch 66.

The cycle counter 61 is initialized each time an edge pulse (enc_trg) is inputted from the encoder edge detection unit 38, and counts a system clock ck to thereby measure a time elapsed after the input of the edge pulse. That is, the cycle counter 61 measures a time period from when an edge pulse is inputted until when a next edge pulse is inputted. A measured value $\beta$ is inputted to the memory 62 and the switch 66.

Each time an edge pulse (enc_trg) is inputted from the encoder edge detection unit 38, the memory 62 stores the measured value $\beta$ by the cycle counter 61 at the time of input of the edge pulse as an edge cycle $\alpha$. The stored edge cycle $\alpha$ is updated each time an edge pulse is inputted. In other words, the latest edge cycle $\alpha$ measured by the cycle counter 61 is always stored in the memory 62. The edge cycle $\alpha$ is inputted to the switch 66.

The target cycle conversion unit 63 converts the target velocity set in the target velocity setting register 53 into a target cycle. The target cycle here means an edge cycle which is measured by the cycle counter 61 and stored in the memory 62 when the carriage 106 is driven at the target velocity.

The comparator 64 compares the target cycle converted by the target cycle conversion unit 63 with the measured value by the cycle counter 61, and outputs a comparison result to the switch 66. Accordingly, immediately after the cycle counter 61 is initialized due to an input of an edge pulse, the measured value by the cycle counter 61 is yet small, specifically smaller than the target cycle, causing the comparator 64 to output a corresponding comparison result.

Subsequently, as the measurement by the cycle counter 61 progresses, the measured value gradually approaches the target cycle. However, when the cycle counter 61 is again initialized due to an input of a next edge pulse before the measured value exceeds the target cycle, a comparison result indicating that "the measured value by the cycle counter 61 has exceeded the target cycle" is not outputted from the comparator 64.

In contrast, when the measurement by the cycle counter 61 progresses and the measured value has exceeded the target cycle before a next edge pulse is inputted, a comparison result indicating that "the measured value by the cycle counter 61 exceeds the target cycle" is outputted from the comparator 64.

Each time a calculation sampling pulse is inputted from the calculation sampling pulse generation unit 45 in the control unit 36 (i.e., at each calculation timing), the switch 66 outputs, as a detection cycle for calculation, one of the edge cycle $\alpha$ stored in the memory 62 and the measured value $\beta$ by the cycle counter 61 at the time, based on the comparison result by the comparator 64 at the time of input of the calculation sampling pulse.

Specifically, when the comparison result by the comparator 64 indicates that "the measured value by the cycle counter 61 is equal to or less than the target cycle" at the time of input of the calculation sampling pulse, the switch 66 outputs the edge cycle $\alpha$ stored in the memory 62 as the detection cycle for calculation. In contrast, when the comparison result by the comparator 64 indicates that "the measured value by the cycle counter 61 exceeds the target cycle" at the time of input of the calculation sampling pulse, the switch 66 outputs the measured value $\beta$ being currently measured by the cycle counter 61 at the time as the detection cycle for calculation.

Figure 5:
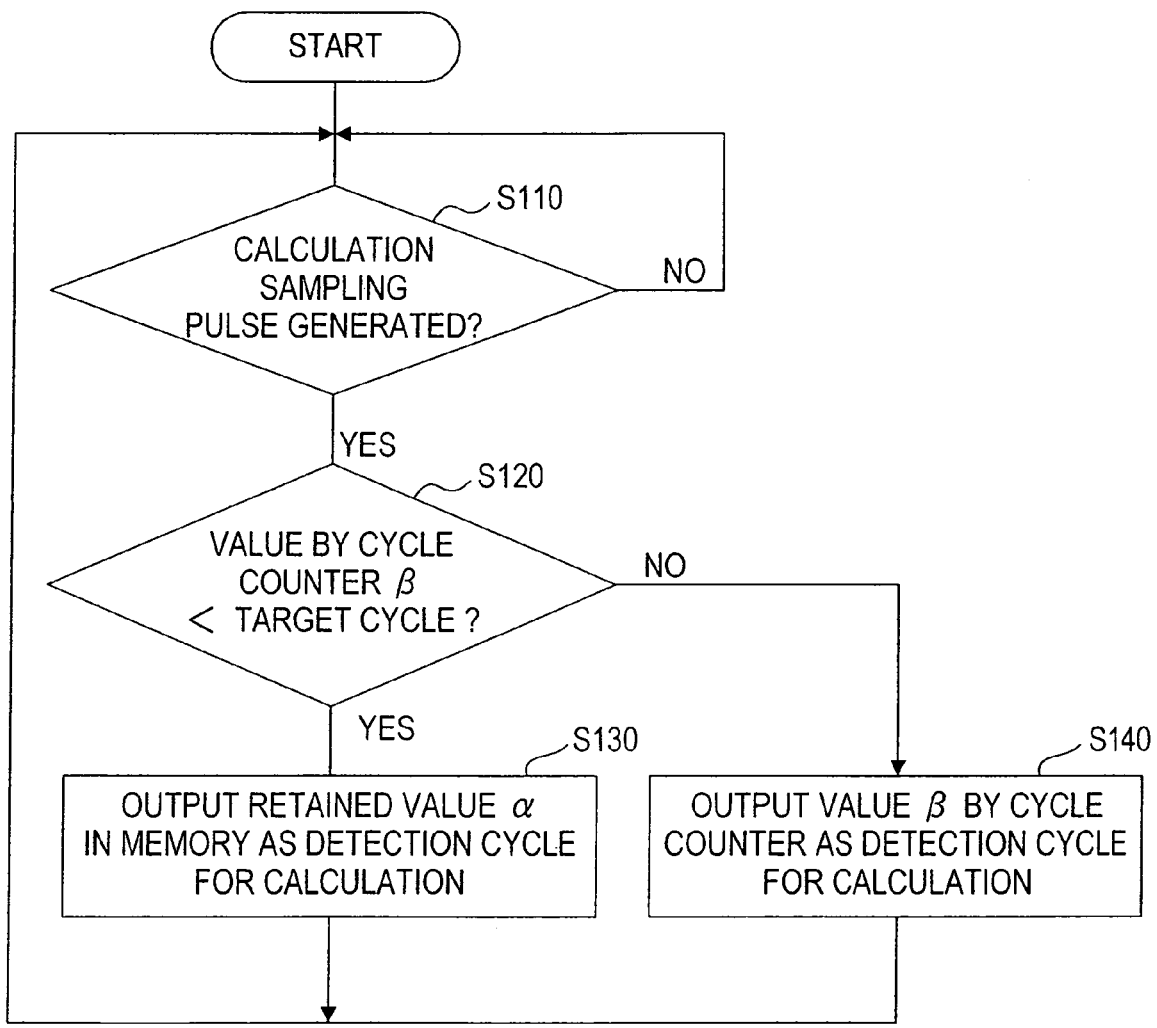
FIG. 5 is a flowchart showing a generation process of a detection cycle for calculation performed by a detection cycle for calculation generating unit in the first embodiment.

That is, generation and output of the detection cycle for calculation by the detection cycle for calculation generating unit 40 in the present embodiment is performed as shown in FIG. 5. FIG. 5 is a flowchart showing a generation process of a detection cycle for calculation performed by the detection cycle for calculation generating unit 40 in the present embodiment. The flowchart of FIG. 5 is a conceptual flowchart only for easy understanding of the generating process of the detection cycle for calculation, and does not show the exact procedure of the generating process. The same is applied to the after-mentioned flowcharts in FIGS. 9, 12 and 15.

In the detection cycle for calculation generating unit 40, as shown in FIG. 5, when a calculation sampling pulse is generated from the calculation sampling pulse generation unit 45 (S110: YES), the measured value $\beta$ by the cycle counter 61 at the time and the target cycle are compared by the comparator 64 (S120).

When the measured value $\beta$ is equal to or less than the target cycle (S120: YES), the edge cycle $\alpha$ stored (retained) in the memory 62 is outputted from the switch 66 as the detection cycle for calculation (S130). When the measured value $\beta$ exceeds the target cycle (S120: NO), the measured value $\beta$ being currently measured by the cycle counter 61 is outputted from the switch 66 as the detection cycle for calculation (S140).

Figure 6:
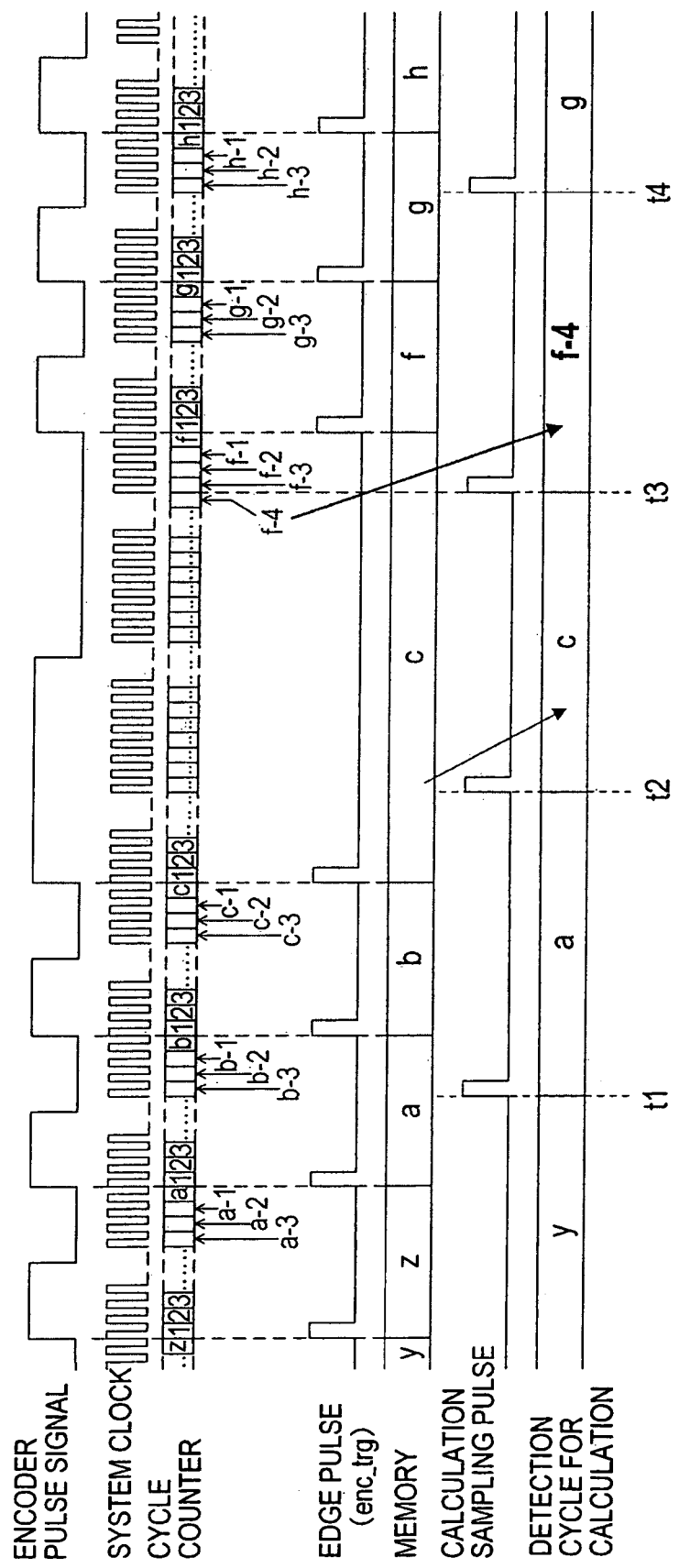
FIG. 6 is a time chart for illustrating a detection cycle for calculation outputted from the detection cycle for calculation generating unit each time a calculation sampling pulse is outputted in the first embodiment.

FIG. 6 shows a specific example of output of a detection cycle for calculation in the present embodiment. FIG. 6 is a time chart for illustrating a detection cycle for calculation outputted from the detection cycle for calculation generating unit 40 at each calculation timing (at each output of a calculation sampling pulse) during constant velocity drive control in which the moving velocity of the carriage 106 is controlled so as to be equal to a target velocity.

As shown in FIG. 6, each time an edge pulse (enc_trg) from the encoder edge detection unit 38 is inputted to the detection cycle for calculation generating unit 40, a measurement result (an edge cycle) by the cycle counter 61 at the time of input of the edge pulse is stored in the memory 62. For example, when the measured value by the cycle counter 61 is "a" at the time of input of the edge pulse, the value "a" is stored in the memory 62.

Each time a calculation sampling pulse is inputted (i.e., at each calculation timing), a detection cycle for calculation is outputted from the detection cycle for calculation generating unit 40. When the measured value being currently measured by the cycle counter 61 is equal to or less than the target cycle at the time (at each calculation timing at a time t1, t2, or t4 in FIG. 6), the edge cycle stored in the memory 62 at the time is outputted as the detection cycle for calculation. For example, at the calculation timing at the time t1, the edge cycle "a" stored in the memory 62 is outputted as the detection cycle for calculation.

However, when the moving velocity of the carriage 106 is decreased due to, for example, a change in load on the reading motor MT1 and an edge pulse is not outputted for a long time period while the carriage 106 is moving, a measured value by the cycle counter 61 at a calculation timing may exceed the target cycle in some cases. The calculation timing at the time t3 in FIG. 6 indicates such a state. That is, f-4 which is the measured value by the cycle counter 61 exceeds the target cycle at the calculation timing at the time t3. However, the edge cycle stored by the memory 62 is not updated from the value at the previous timing (the time t2). In this case, f-4 which is the measured value by the cycle counter 61 at the time is outputted, instead of the edge cycle stored by the memory 62, as the detection cycle for calculation.

Figure 7A:
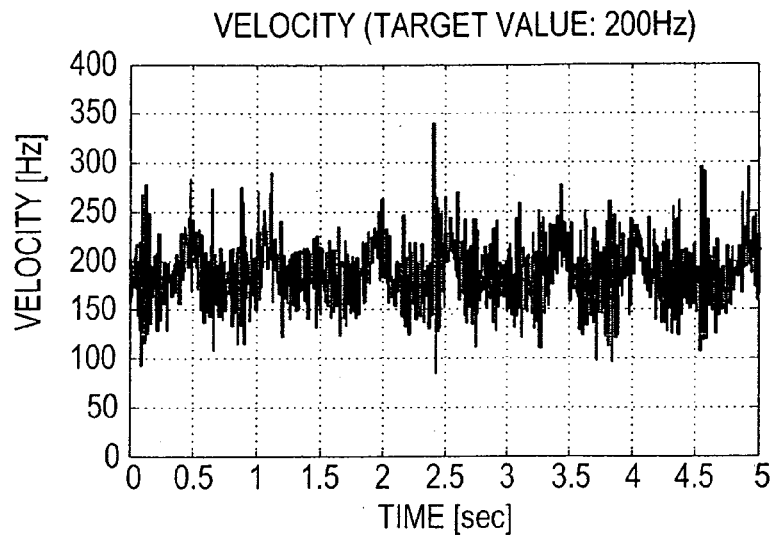
FIGS. 7A to 7C are explanatory views showing an experimental example in a case of constant velocity drive control of a driven object according to a control method in the first embodiment.
Figure 7B:
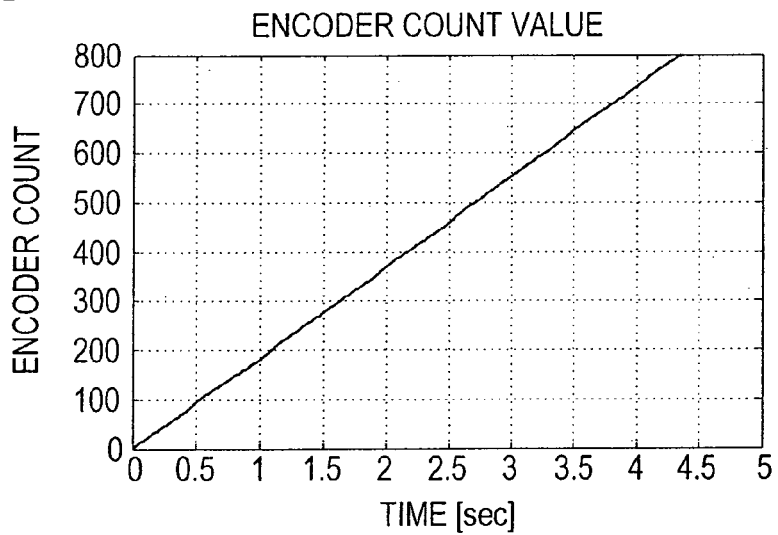
Figure 7C:
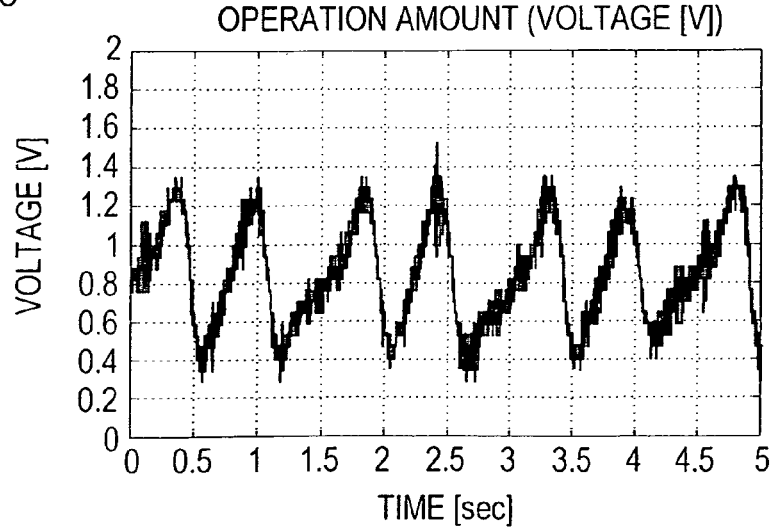

FIGS. 7A to 7C show changes (in an experimental example) in velocity, encoder count value (count value of edge pulses) and operation amount during constant velocity drive control of the reading motor MT1 in the present embodiment. In FIG. 7A, a frequency of an edge pulse indirectly indicating a velocity is used as the velocity of the driven object in a same manner as in above described FIG. 20A.

Figure 20A:
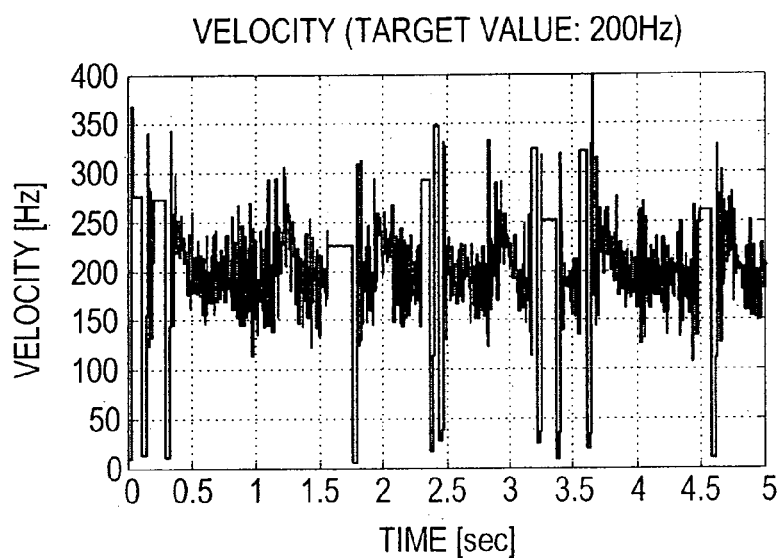
FIGS. 20A to 20C are explanatory views showing an experimental example in a case of constant velocity drive control of a driven object according to a conventional control method.
Figure 20B:
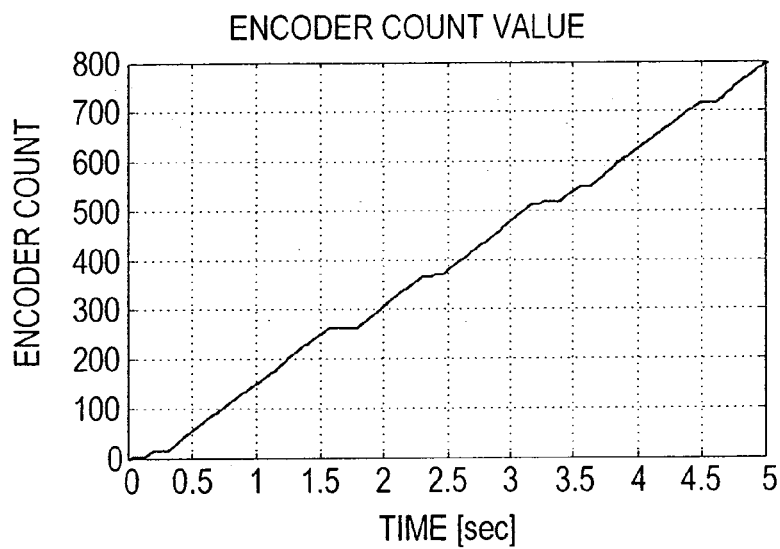
Figure 20C:
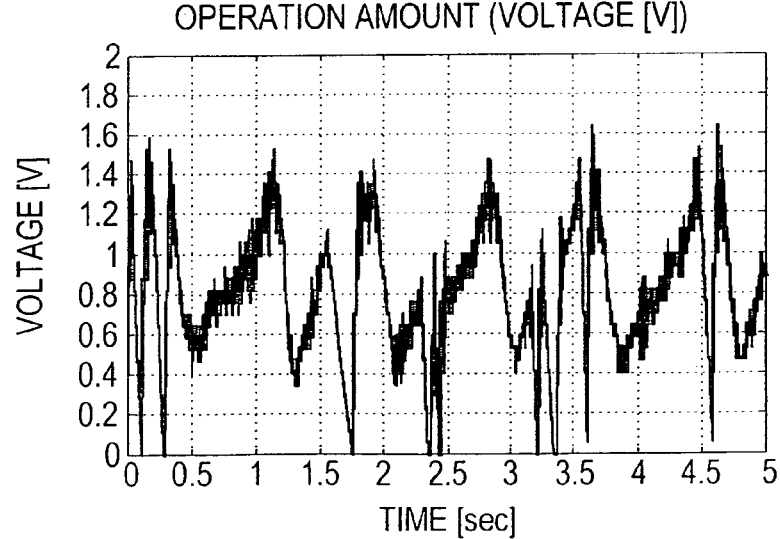

Comparison between FIGS. 7A to 7C as the experimental example to which the present invention is applied and FIGS. 20A to 20C as a conventional experimental example clearly shows the following. In the conventional example (FIGS. 20A to 20C), when the load applied to the motor is fluctuated (increased) while the motor is driven and an actual velocity is decreased, the state continues and the velocity cannot easily be returned to a target velocity. In the present embodiment (FIGS. 7A to 7C), a fluctuation range from the target velocity is substantially decreased as compared with FIGS. 20A to 20C. In the present embodiment, in contrast, although the load applied to the motor is fluctuated (increased) and the velocity is decreased temporarily (for a very short time period), the decrease in velocity is rapidly reflected to the control unit 36 and an operation amount required to return the velocity to the target velocity is calculated. Accordingly, the motor can be rapidly returned to the target velocity without being kept in a state of decreased velocity for a long time period or being stopped.

[4] Operation and Advantage of First Embodiment

In a conventional method, the edge cycle stored in the memory 62 is simply used as the detection cycle for calculation. According to the above-described present embodiment, unlike the conventional method, selection is made at each calculation timing on which of the edge cycle α stored in the memory 62 or the measured value β measured by the cycle counter 61 at the time should be outputted as the detection cycle for calculation. Specifically, when the measured value β at the time is equal to or less than the target cycle, the edge cycle α stored in the memory 62 is outputted as the detection cycle for calculation the same as in the conventional method, while when the measured value β at the time exceeds the target cycle, the measured value β is outputted as the detection cycle for calculation.

That the actual measured value β by the cycle counter 61 exceeds the target cycle at a timing means that an actual velocity of the carriage 106 is lower than the target velocity. In this case, the measured value β by the cycle counter 61 is outputted, instead of the edge cycle α stored in the memory 62, as the detection cycle for calculation in the present embodiment. The measured value β is a value to which the actual velocity of the carriage 106 at the time is more reflected.

Accordingly, a moving velocity obtained based on the measured value β at the time is lower than a moving velocity obtained based on the edge cycle α stored in the memory 62, which enables the control unit 36 to recognize more rapidly that the velocity of the carriage 106 has become lower than the target velocity. Thus, the control unit 36 may perform more rapidly a process (control amount calculation and the like) to increase the velocity of the carriage 106 to the target velocity, to thereby rapidly return the velocity of the carriage 106 to the target velocity.

Second Embodiment

A component to generate and output a detection cycle for calculation is not limited to the detection cycle for calculation generating unit 40 described in the first embodiment, but may have various configurations. Three specific examples of the detection cycle for calculation generating unit different from the detection cycle for calculation generating unit 40 in the first embodiment will be described below as a second embodiment, a third embodiment and a fourth embodiment.

Figure 8:
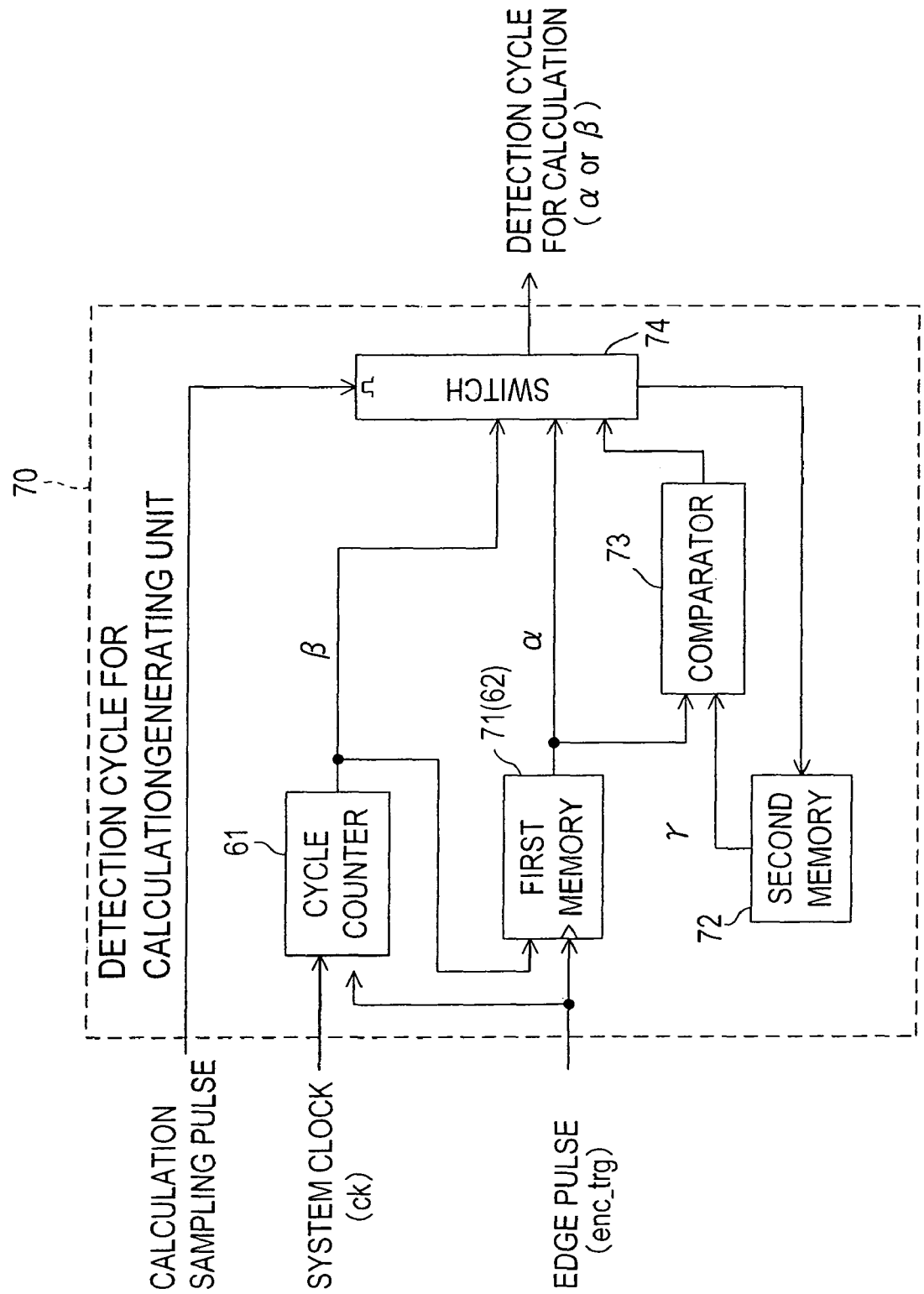
FIG. 8 is a block diagram showing a configuration of a detection cycle for calculation generating unit in a second embodiment.

A detection cycle for calculation generating unit 70 in the second embodiment is shown in FIG. 8. Since components other than the detection cycle for calculation generating unit 70 are the same as in the first embodiment, a description will be made below only on a configuration and a function of the detection cycle for calculation generating unit 70. A cycle of the calculation timing (i.e., an output cycle of the calculation sampling pulse from the calculation sampling pulse generation unit 45) is set to a value equal to or more than the target cycle in the present embodiment. The same is applicable also in the after-mentioned third and fourth embodiments.

As shown in FIG. 8, the detection cycle for calculation generating unit 70 in the present embodiment includes a cycle counter 61, a first memory 71, a second memory 72, a comparator 73 and a switch 74. Since the cycle counter 61 is the same as the cycle counter 61 in the first embodiment and the first memory 71 is the same as the memory 62 in the first embodiment, detailed explanations of these components are not repeated.

The comparator 73 compares an edge cycle α stored in the first memory 71 with a predetermined edge cycle γ stored in the second memory 72, and outputs a comparison result to the switch 74.

Each time a calculation sampling pulse is inputted (at each calculation timing), the switch 74 outputs, as a detection cycle for calculation, one of the edge cycle α stored in the first memory 71 and a measured value β by the cycle counter 61 at the time of input of the calculation sampling pulse, based on the comparison result by the comparator 73 at the time.

Specifically, when the edge cycle α stored in the first memory 71 is different from the edge cycle γ stored in the second memory 72 at the time of input of the calculation sampling pulse, the switch 74 outputs the edge cycle α stored in the first memory 71 as the detection cycle for calculation, and also outputs the stored value in the first memory 71 (i.e., the edge cycle α) to the second memory 72. Then, the second memory 72 stores the edge cycle ("α" in the present case) outputted from the switch 74.

When the edge cycle α stored in the first memory 71 is equal to the edge cycle γ stored in the second memory 72 at the time of input of the calculation sampling pulse, that is, when the stored value in the first memory 71 has not been updated since the previous calculation timing until the current calculation timing, the switch 74 outputs the measured value β being currently measured by the cycle counter 61 as the detection cycle for calculation.

Figure 9:
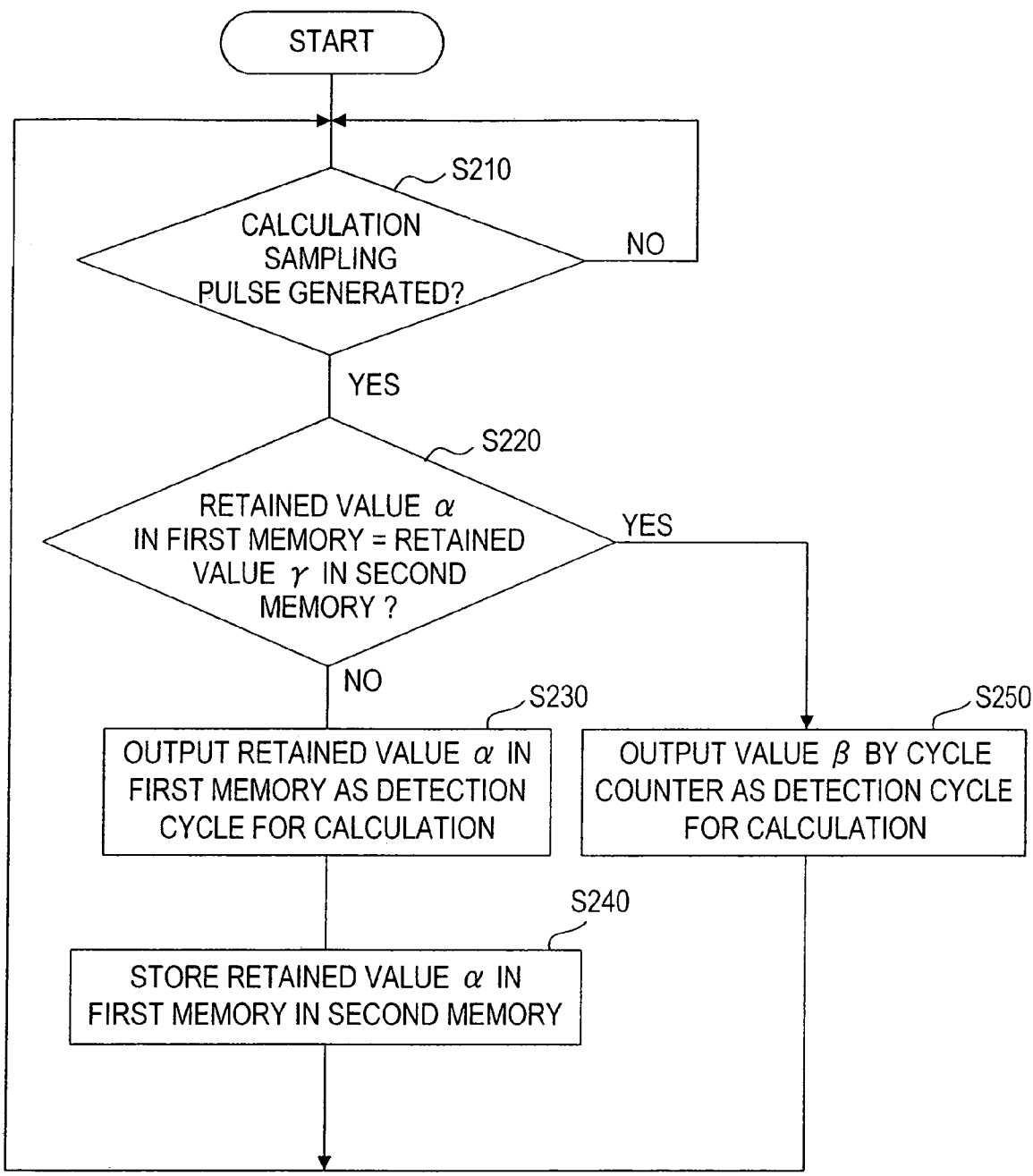
FIG. 9 is a flowchart showing a generation process of a detection cycle for calculation performed by a detection cycle for calculation generating unit in the second embodiment.

That is, generation and output of the detection cycle for calculation by the detection cycle for calculation generating unit 70 in the present embodiment is performed as shown in FIG. 9. FIG. 9 is a flowchart showing a generation process of a detection cycle for calculation performed by the detection cycle for calculation generating unit 70 in the present embodiment.

In the detection cycle for calculation generating unit 70, as shown in FIG. 9, when a calculation sampling pulse is generated from the calculation sampling pulse generation unit 45 (S210: YES), the edge cycle α stored (retained) in the first memory 71 and the edge cycle γ stored in the second memory 72 are compared with each other by the comparator 73 (S220).

When the edge cycle α and the edge cycle γ are not equal to each other (S220: NO), the edge cycle α stored in the first memory 71 is outputted as the detection cycle for calculation from the switch 74 (S230), and also the edge cycle α stored in the first memory 71 is stored (retained) in the second memory 72 (S240). When the edge cycle α and the edge cycle γ are equal to each other (S220: YES), the measured value β being currently measured by the cycle counter 61 is outputted as the detection cycle for calculation by the switch 74 (S250).

Figure 10:
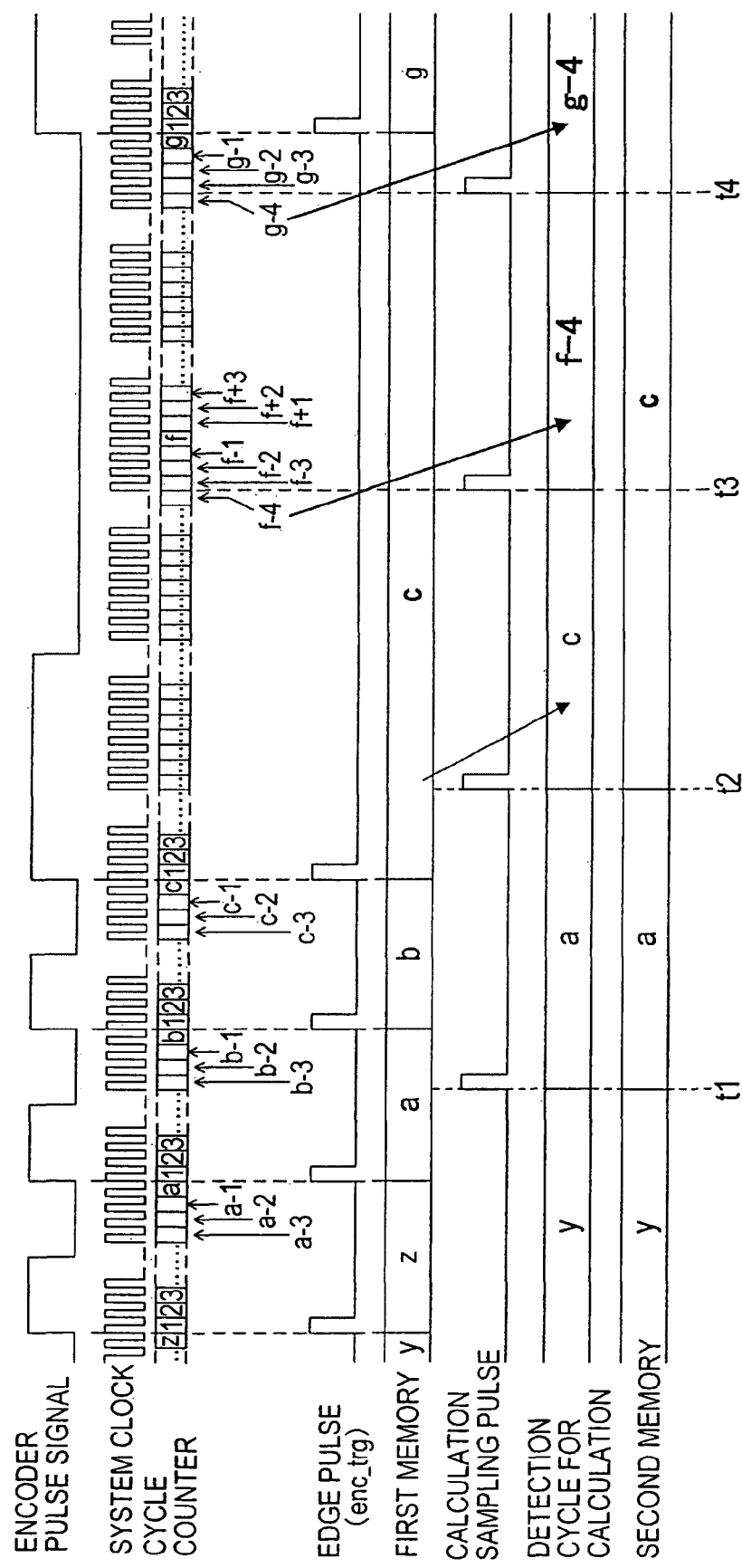
FIG. 10 is a time chart for illustrating a detection cycle for calculation outputted from the detection cycle for calculation generating unit each time a calculation sampling pulse is outputted in the second embodiment.

FIG. 10 shows a specific example of output of a detection cycle for calculation in the present embodiment. As shown in FIG. 10, each time an edge pulse (enc_trg) is inputted from the encoder edge detection unit 38 to the detection cycle for calculation generating unit 70, a measurement result (i.e., an edge cycle) by the cycle counter 61 at the time of input of the edge pulse is stored in the first memory 71.

Each time a calculation sampling pulse is inputted (i.e., at each calculation timing), a detection cycle for calculation is outputted from the detection cycle for calculation generating unit 70. When the edge cycle α stored in the first memory 71 is different from the edge cycle γ stored in the second memory 72 (at a calculation timing at a time t1 or t2 in FIG. 10), the edge cycle stored in the first memory 71 at the time is outputted as the detection cycle for calculation.

However, when the moving velocity of the carriage 106 is decreased while the carriage 106 is moving due to, for example, a change in load on the reading motor MT1 and an edge pulse is not outputted for a long time period, the stored value in the first memory 71 remains in a state of being not updated and equal to the stored value in the second memory 72. The calculation timing at a time t3 or t4 in FIG. 10 indicates such a state. In this case, the measured value by the cycle counter 61 at the time is outputted instead of the edge cycle stored in the first memory 71. Specifically, at the time t3, a measured value f-4 at the time is outputted, while at the time t4, a measured value g-4 at the time is outputted.

According to the present embodiment, therefore, it may be possible to determine which of the edge cycle α stored in the first memory 71 and the measured value β measured by the cycle counter 61 should be outputted as the detection cycle for calculation by a simple method of comparing the edge cycle α stored in the first memory 71 and the value at the previous calculation timing (i.e., the value γ stored in the second memory 72).

Third Embodiment

Figure 11:
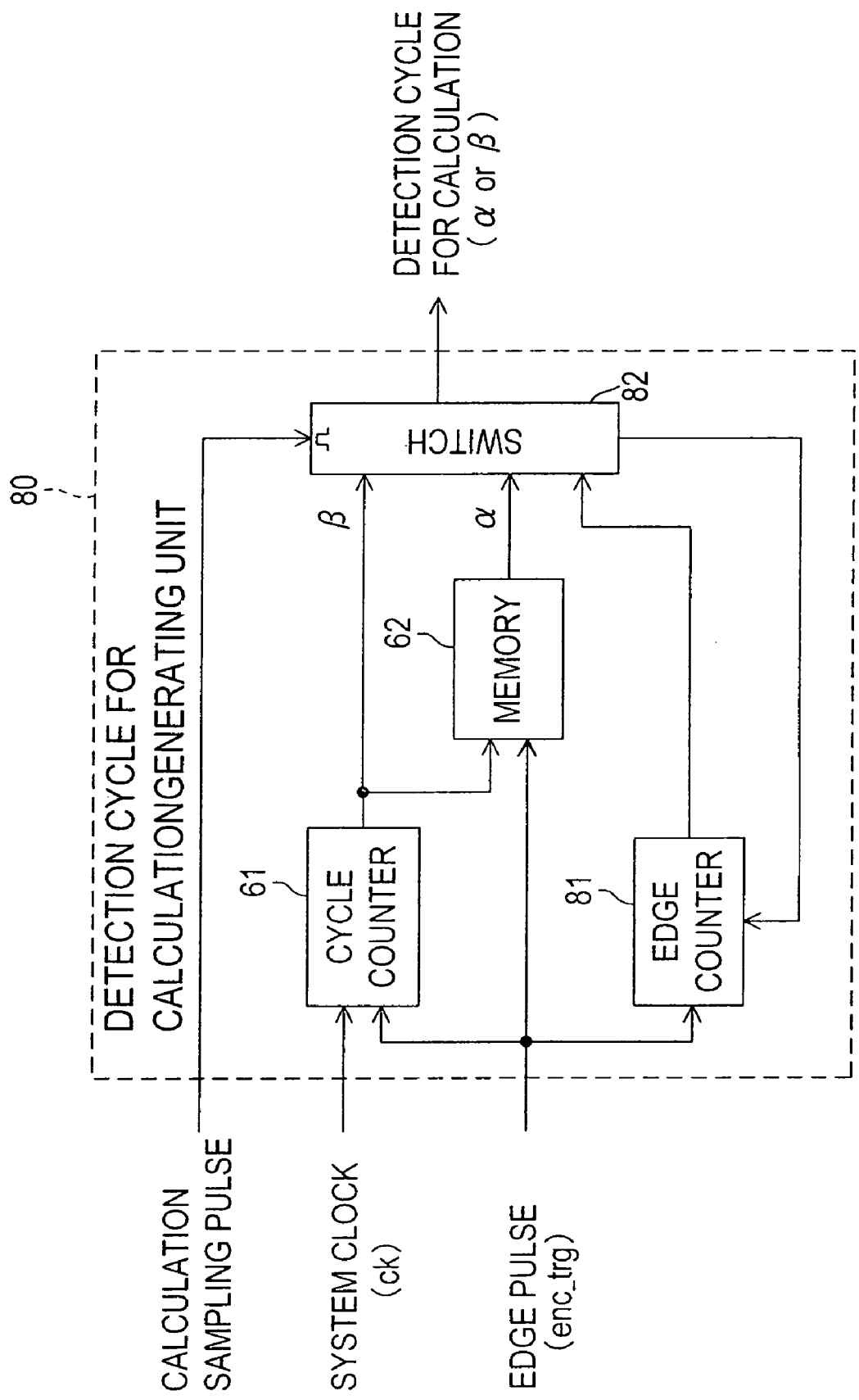
FIG. 11 is a block diagram showing a configuration of a detection cycle for calculation generating unit in a third embodiment.

A detection cycle for calculation generating unit 80 in the third embodiment is shown in FIG. 11. Also in the present embodiment, components other than the detection cycle for calculation generating unit 80 are the same as in the first embodiment. Also, as described above, a cycle of the calculation timing (i.e., an output cycle of the calculation sampling pulse from the calculation sampling pulse generation unit 45) is set to a value equal to or more than the target cycle.

As shown in FIG. 11, the detection cycle for calculation generating unit 80 in the present embodiment includes a cycle counter 61, a memory 62, an edge number counter 81 and a switch 82. Since the cycle counter 61 and the memory 62 are the same as the cycle counter 61 and the memory 62 in the first embodiment, respectively, detailed explanations of these components are not repeated.

The edge number counter 81 counts the number of edge pulses, and a counted value by the edge number counter 81 is inputted to the switch 82. The edge number counter 81 is initialized (or cleared) when an initialization signal is inputted from the switch 82.

Each time a calculation sampling pulse is inputted (i.e., at each calculation timing), the switch 82 determines whether or not the counted value by the edge number counter 81 at the time of input of the calculation sampling pulse is "0".

When the counted value is determined as not "0" (that is, determined as "1" or more), the switch 82 outputs the edge cycle α stored in the memory 62 as a detection cycle for calculation, and outputs an initialization signal to the edge number counter 81. Then, the counted value of the edge number counter 81 is cleared.

When the counted value is determined as "0" at the time of input of the calculation sampling pulse, i.e., when an edge pulse has not at all been inputted since the previous calculation timing until the current calculation timing, the switch 82 outputs the measured value β by the cycle counter 61 at the time as the detection cycle for calculation.

Figure 12:
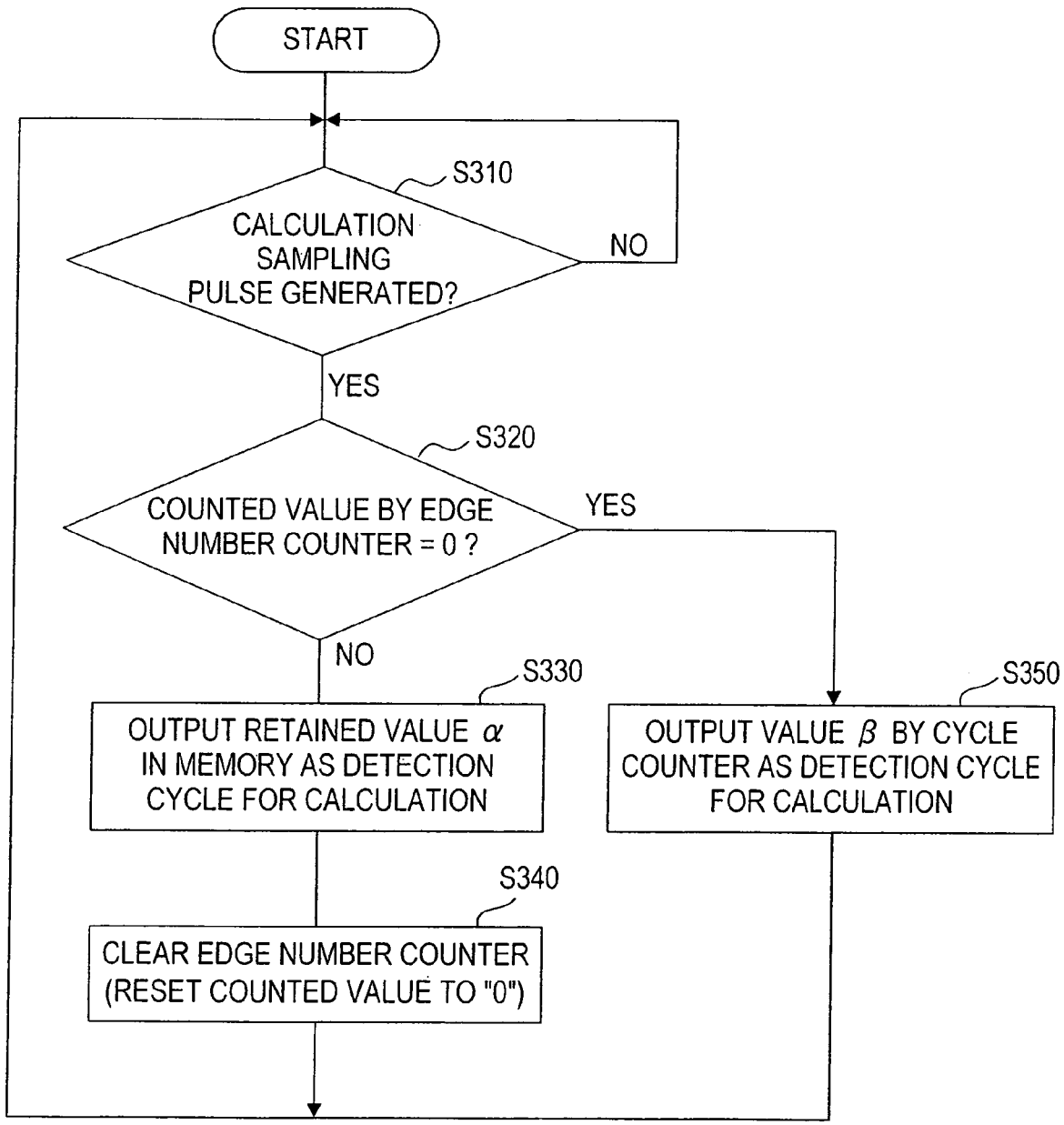
FIG. 12 is a flowchart showing a generation process of a detection cycle for calculation performed by a detection cycle for calculation generating unit in the third embodiment.

That is, generation and output of the detection cycle for calculation by the detection cycle for calculation generating unit 80 in the present embodiment is performed as shown in FIG. 12. FIG. 12 is a flowchart showing a generation process of a detection cycle for calculation performed by the detection cycle for calculation generating unit 80 in the present embodiment.

In the detection cycle for calculation generating unit 80, as shown in FIG. 12, when a calculation sampling pulse is generated from the calculation sampling pulse generation unit 45 (S310: YES), it is determined whether or not the counted value by the edge number counter 81 is "0" (S320).

When the counted value by the edge number counter 81 is not "0" (S320: NO), the edge cycle α stored in the memory 62 is outputted from the switch 82 as the detection cycle for calculation (S330) and also the counted value by the edge number counter 81 is cleared (S340). When the counted value by the edge number counter 81 is "0" (S320: YES), the measured value β being currently measured by the cycle counter 61 is outputted from the switch 82 as the detection cycle for calculation (S350).

Figure 13:
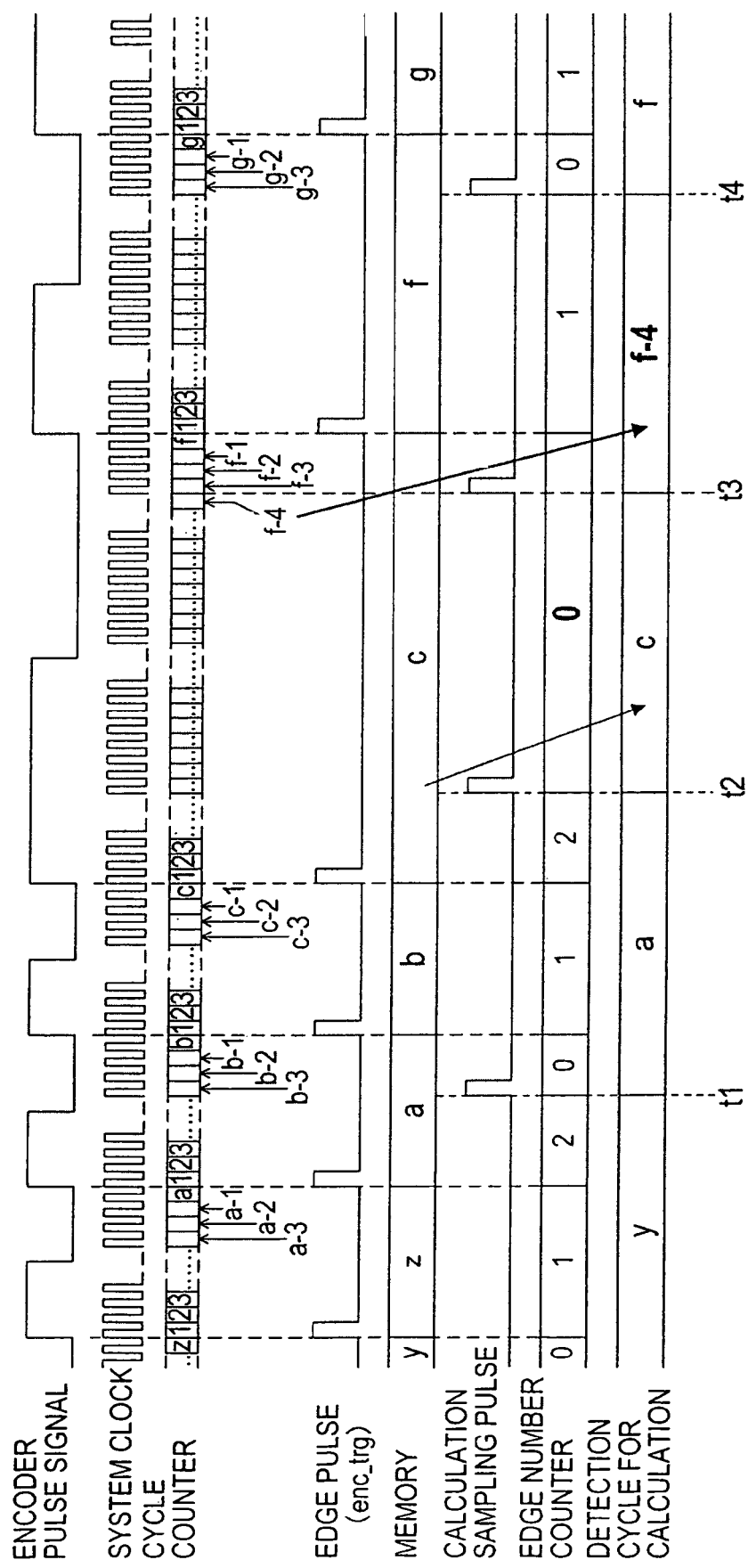
FIG. 13 is a time chart for illustrating a detection cycle for calculation outputted from the detection cycle for calculation generating unit each time a calculation sampling pulse is outputted in the third embodiment.

FIG. 13 shows a specific example of output of a detection cycle for calculation in the present embodiment. As shown in FIG. 13, each time a calculation sampling pulse is inputted (i.e., at each calculation timing), a detection cycle for calculation is outputted from the detection cycle for calculation generating unit 80. When the counted value by the edge number counter 81 is not "0" (at each calculation timing at a time t1, t2, or t4 in FIG. 13), the edge cycle stored in the memory 62 at the time is outputted as the detection cycle for calculation.

However, when the moving velocity of the carriage 106 is decreased while the carriage 106 is moving due to, for example, a change in load on the reading motor MT1 and an edge pulse is not outputted for a long time period, the counted value by the edge number counter 81 is not increased and remains to be "0". The calculation timing at the time t3 in FIG.

13 indicates such a state. In this case, the measured value by the cycle counter 61 at the time is outputted, instead of the edge cycle stored by the memory 62, as the detection cycle for calculation. Specifically, f-4 which is the measured value at the time t3 is outputted.

According to the present embodiment, therefore, it may be possible to determine which of the edge cycle α stored in the memory 62 and the measured value β measured by the cycle counter 61 should be outputted as the detection cycle for calculation by a simple method of determining whether or not the counted value by the edge number counter 81 is "0" at a calculation timing.

Fourth Embodiment

Figure 14:
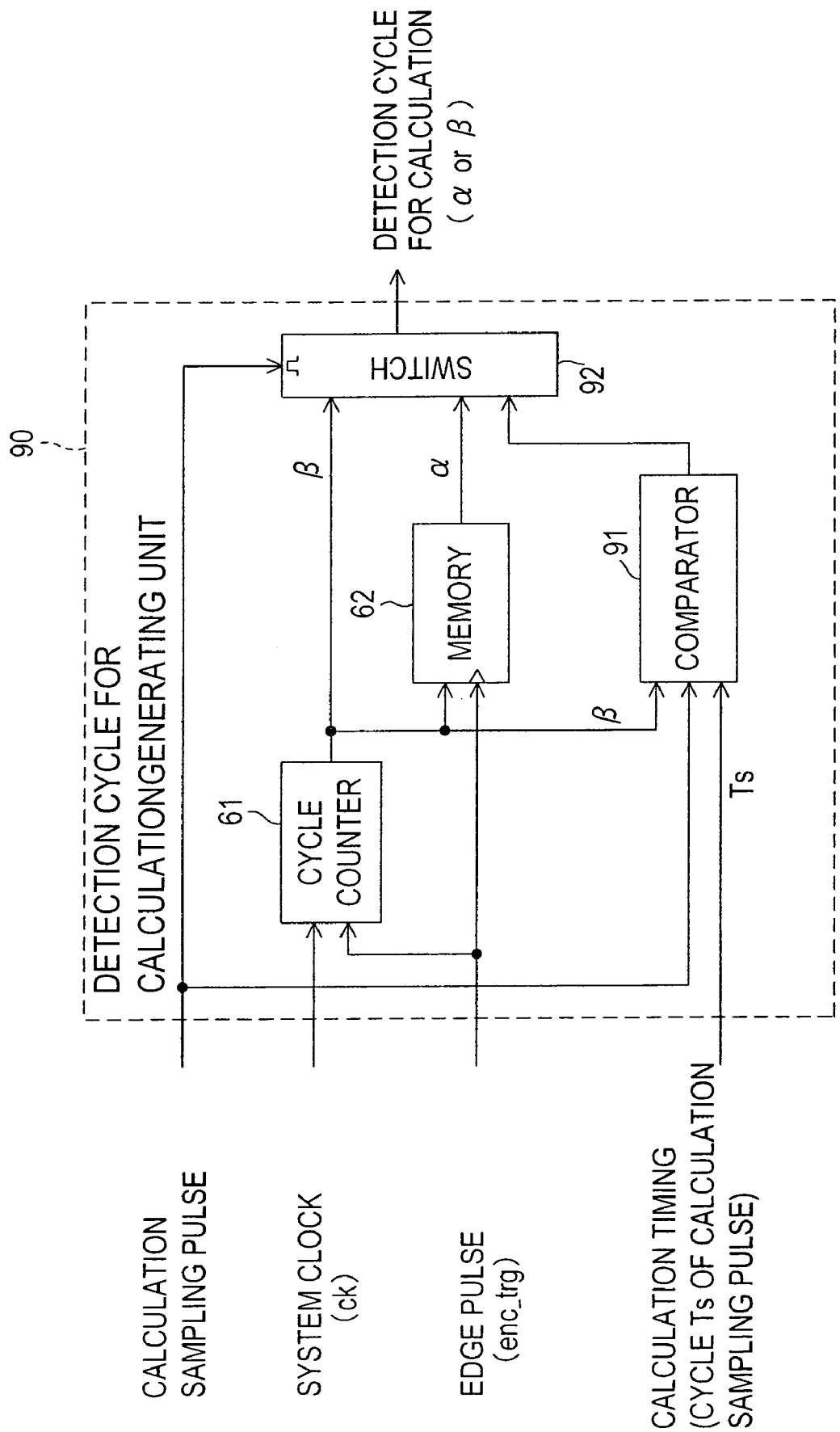
FIG. 14 is a block diagram showing a configuration of a detection cycle for calculation generating unit in a fourth embodiment.

A detection cycle for calculation generating unit 90 in the fourth embodiment is shown in FIG. 14. Also in the present embodiment, components other than the detection cycle for calculation generating unit 90 are the same as in the first embodiment. As described above, a cycle of the calculation timing (i.e., an output cycle of the calculation sampling pulse from the calculation sampling pulse generation unit 45) is set to a value equal to or more than the target cycle.

As shown in FIG. 14, the detection cycle for calculation generating unit 90 in the present embodiment includes a cycle counter 61, a memory 62, a comparator 91 and a switch 92. Since the cycle counter 61 and the memory 62 are the same as the cycle counter 61 and the memory 62 in the first embodiment, respectively, detailed explanations of these components are not repeated.

A calculation timing (i.e., a cycle Ts in which a calculation sampling pulse is outputted) set in the calculation timing setting register 56 (see FIG. 3) is inputted to the comparator 91. Each time of input of a calculation sampling pulse, the comparator 91 compares the measured value by the cycle counter 61 at the calculation timing with the cycle Ts of the calculation sampling pulse, and outputs a comparison result to the switch 92.

When it is determined by the comparator 91 at the time of input of the calculation sampling pulse that the measured value by the cycle counter 61 is equal to or less than the cycle Ts of the calculation sampling pulse, the switch 92 outputs the edge cycle α stored in the memory 62 as the detection cycle for calculation.

When it is determined by the comparator 91 that the measured value by the cycle counter 61 exceeds the cycle Ts of the calculation sampling pulse, i.e., when an edge pulse has not at all been inputted since the previous calculation timing until the current calculation timing, the switch 92 outputs the measured value β being measured by the cycle counter 61 at the time as the detection cycle for calculation.

Figure 15:
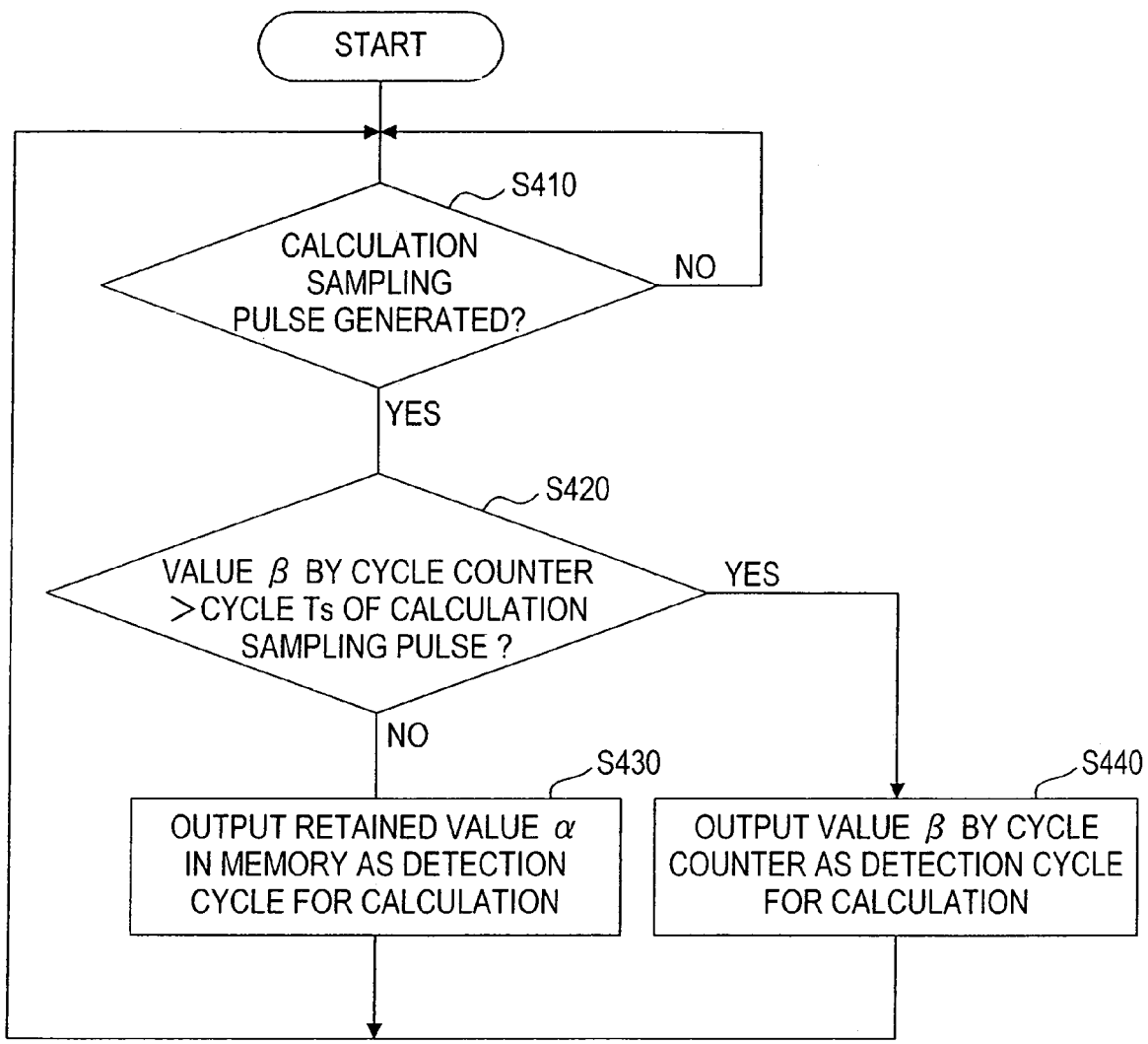
FIG. 15 is a flowchart showing a generation process of a detection cycle for calculation performed by a detection cycle for calculation generating unit in the fourth embodiment.

That is, generation and output of the detection cycle for calculation by the detection cycle for calculation generating unit 90 in the present embodiment is performed as shown in FIG. 15. In the detection cycle for calculation generating unit 90, as shown in FIG. 15, when a calculation sampling pulse is generated from the calculation sampling pulse generation unit 45 (S410: YES), the measured value β by the cycle counter 61 at the time and the cycle Ts of the calculation sampling pulse are compared by the comparator 91 (S420).

When the measured value β by the cycle counter 61 is equal to or less than the cycle Ts of the calculation sampling pulse (S420: NO), the edge cycle α stored in the memory 62 is outputted from the switch 92 as the detection cycle for calculation (S430).

When the measured value β by the cycle counter 61 exceeds the cycle Ts of the calculation sampling pulse (S420: YES), the measured value β being currently measured by the cycle counter 61 is outputted from the switch 92 as the detection cycle for calculation (S440).

Figure 16:
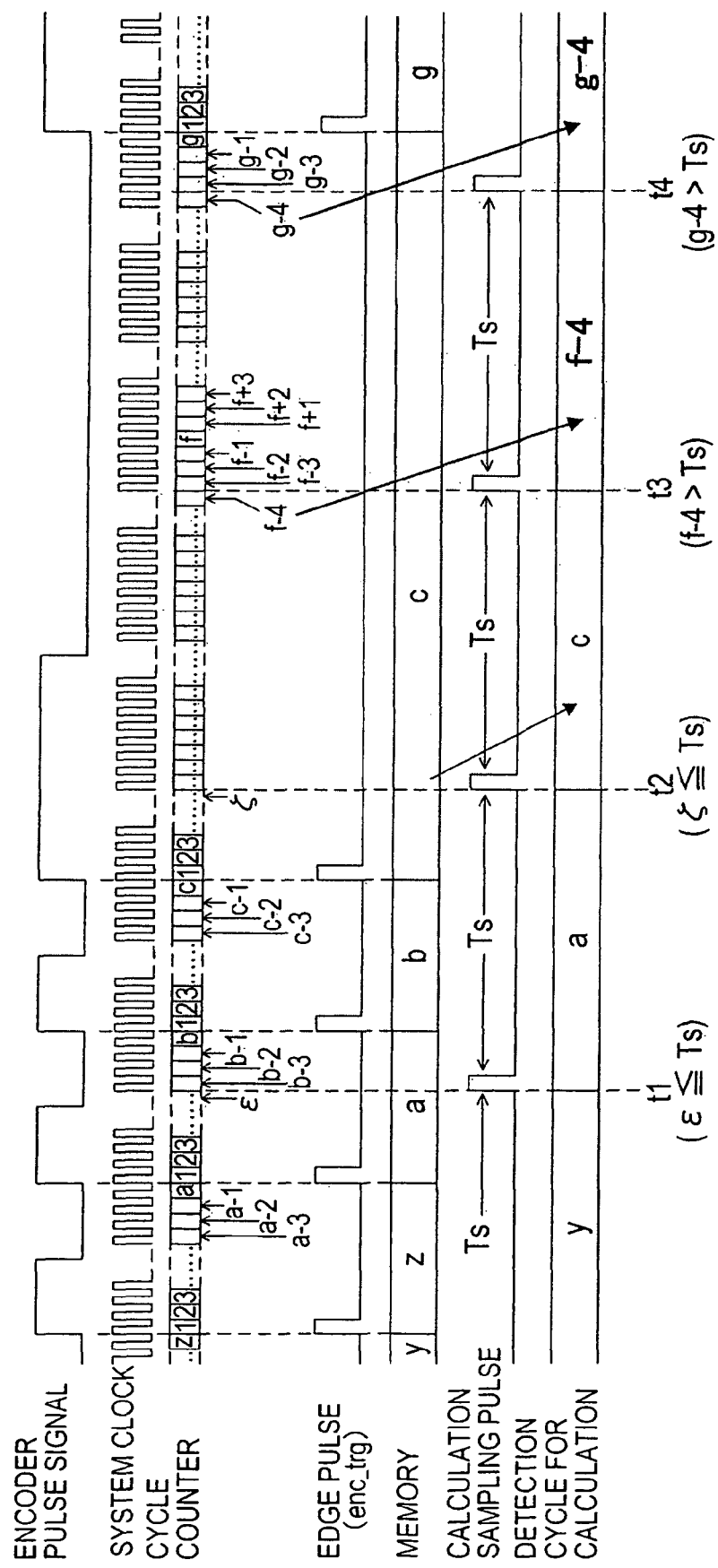
FIG. 16 is a time chart for illustrating a detection cycle for calculation outputted from the detection cycle for calculation generating unit each time a calculation sampling pulse is outputted in the fourth embodiment.
Figure 17:
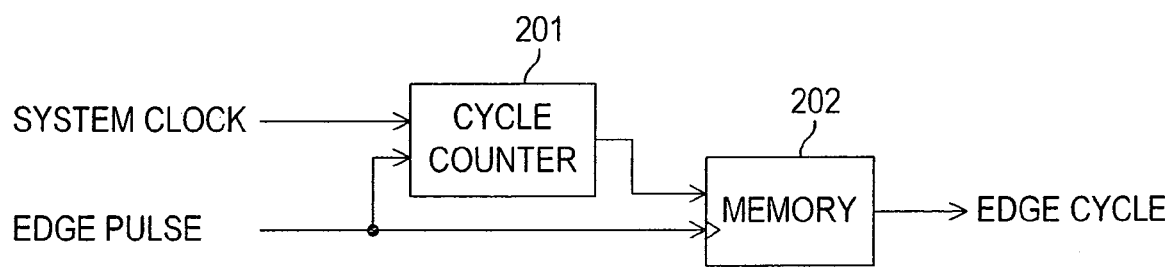
FIG. 17 is an explanatory view illustrating a conventional edge cycle measurement method.
Figure 18:
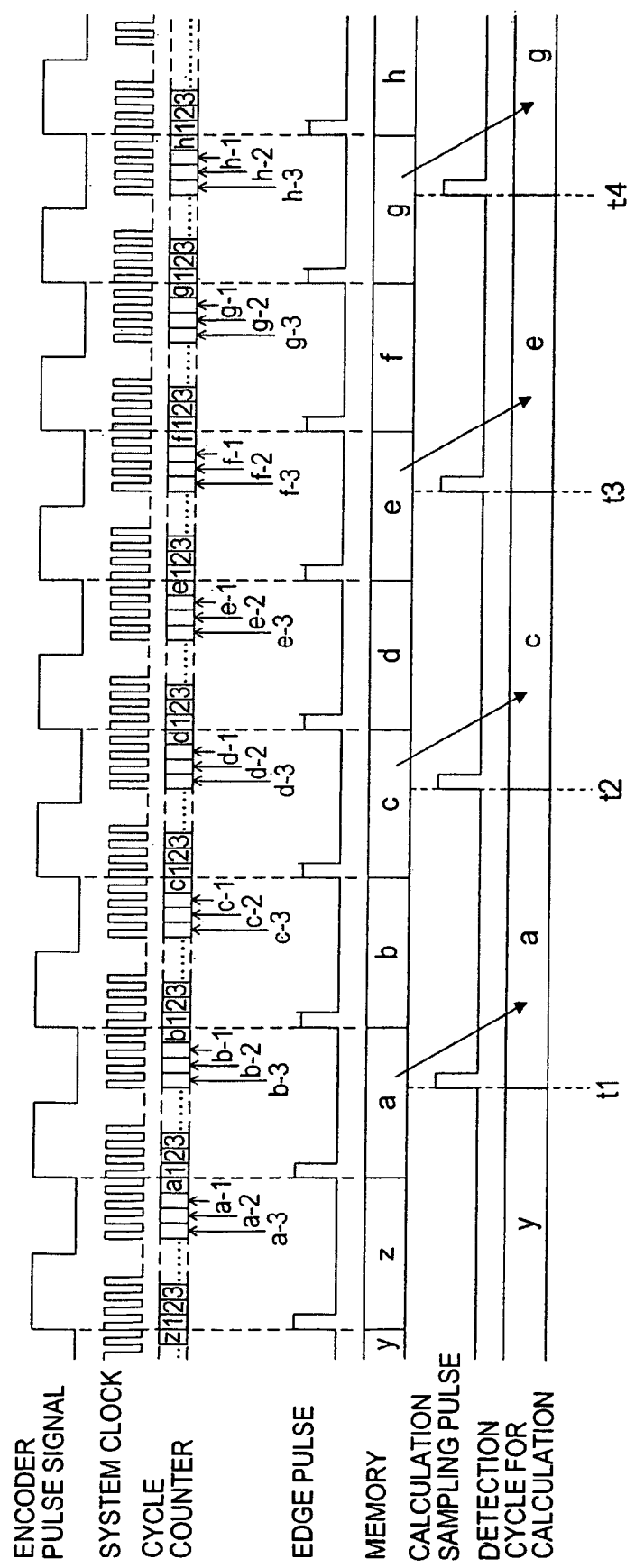
FIG. 18 is a time chart for illustrating that each time a calculation sampling pulse is outputted, an edge cycle at the each time is used as a detection cycle for calculation during a constant velocity driving of a driven object.
Figure 19:
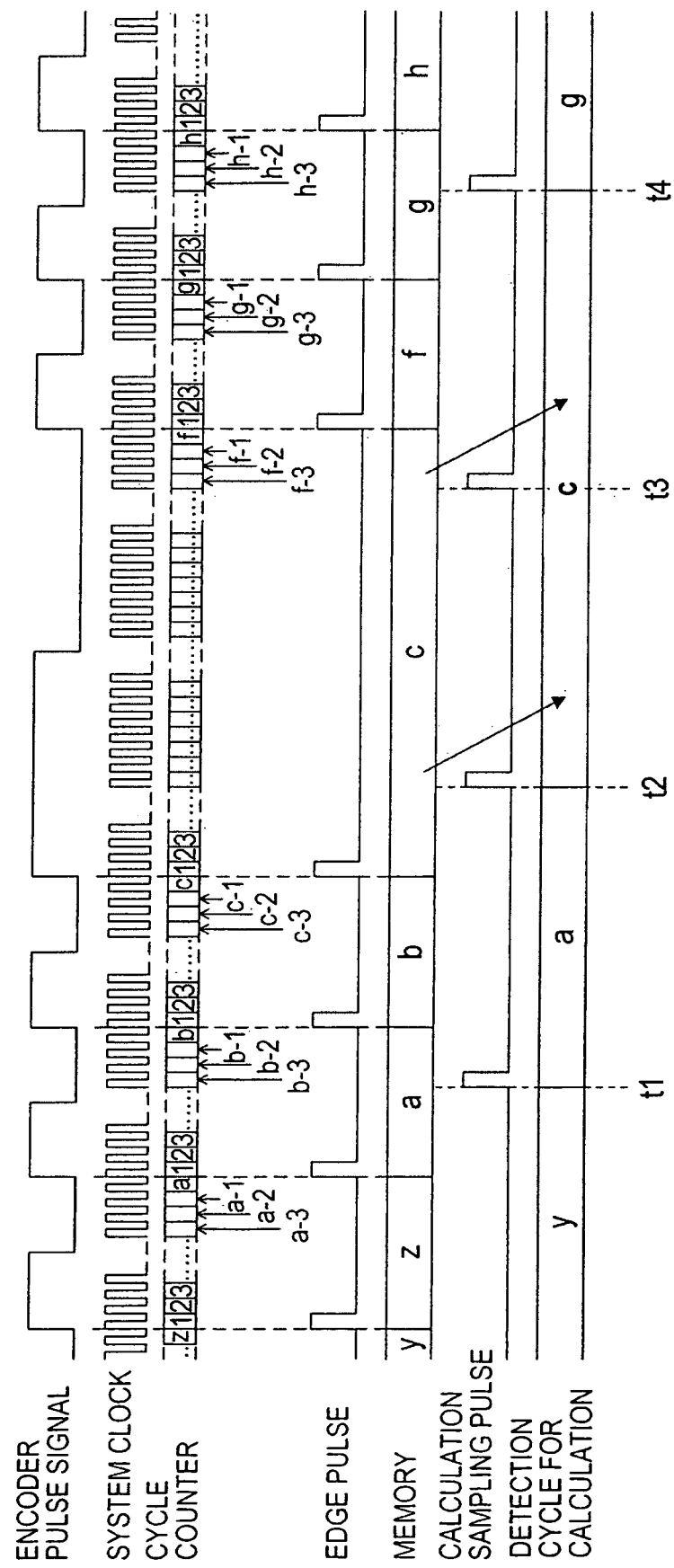
FIG. 19 is a time chart for illustrating that a detection cycle for calculation used each time a calculation sampling pulse is outputted in a case where a driven velocity of a driven object is lowered.

FIG. 16 shows a specific example of output of a detection cycle for calculation in the present embodiment. As shown in FIG. 16, each time a calculation sampling pulse is inputted (i.e., at each calculation timing), a detection cycle for calculation is outputted from the detection cycle for calculation generating unit 90. When a measured value by the cycle counter 61 is equal to or less than the cycle Ts of the calculation sampling pulse (at each calculation timing at a time t1 or t2 in FIG. 16), the edge cycle stored in the memory 62 at the time is outputted as the detection cycle for calculation.

However, when the moving velocity of the carriage 106 is decreased while the carriage 106 is moving due to, for example, a change in load on the reading motor MT1 and an edge pulse is not outputted for a long time period, the measured value by the cycle counter 61 may exceed the cycle Ts of the calculation sampling pulse. The calculation timing at a time t3 or t4 in FIG. 16 indicates such a state. In this case, the measured value by the cycle counter 61 at the time is outputted, instead of the edge cycle stored by the memory 62, as the detection cycle for calculation. Specifically, at the time t3, a measured value f-4 at the time is outputted and, at the time t4, a measured value g-4 at the time is outputted.

According to the present embodiment, therefore, it may be possible to determine which of the edge cycle α stored in the memory 62 and the measured value β by the cycle counter 61 should be outputted as the detection cycle for calculation by a simple method of comparing, at a calculation timing, the measured value by the cycle counter 61 at the time and the cycle Ts of the calculation sampling pulse.

Modified Examples

It is to be understood that the present invention should not be limited to the above described embodiments, but may be embodied in various forms within the technical scope of the present invention.

For example, in the first embodiment, the target cycle is used by the detection cycle for calculation generating unit 40 as a criterion for comparison determination on which of the edge cycle α stored in the memory 62 and the measured value β being currently measured by the cycle counter 61 should be outputted (that is, the target cycle and the measured value β by the cycle counter 61 are compared). However, this is only an example, and it may be possible to compare a value other than the target cycle with the measured value β by the cycle counter 61.

Specifically, for example, in a case where the measured value β by the cycle counter 61 is also inputted to the control unit 36 and the control unit 36 is configured to detect an abnormality when the measured value β exceeds a predetermined upper limit measured value and perform a specified processing (for example, to forcibly stop the reading motor MT1), a specific value within a range equal to or more than the target cycle and equal to or less than the upper limit measured value may be used as the criterion for comparison determination.

Also, for example, in a case where the control unit 36 is configured to control the moving speed of the carriage 106 so as not to exceed a specified velocity variable range including the target velocity (for example, a range of ±5% of the target velocity), a specific value which is equal to or more than the target cycle and is equal to or less than a cycle corresponding to a lower limit velocity within the velocity variable range (i.e., an edge cycle stored by the memory 62 when the carriage 106 is moved at the lower limit velocity) may be used as the criterion for comparison determination.

In this regard, however, it is preferable to use the target cycle as the criterion for comparison determination as in the first embodiment in order to immediately reflect a decrease in the actual moving velocity of the carriage 106 from the target velocity to the control of the moving velocity.

In the above described embodiments, the calculation sampling pulse from the calculation sampling pulse generation unit 45 is received by the detection cycle for calculation generating unit 40 and the switch 66 (, 74, 82 or 92) outputs the detection cycle for calculation in synchronization with the calculation sampling pulse. However, a configuration may be possible where the calculation timing set in the calculation timing setting register 56 is received by the detection cycle for calculation generating unit 40 and the detection cycle for calculation is outputted in a cycle indicated by the calculation timing.

In the above described embodiments, an edge pulse is outputted based on an edge (a rising edge of an A-phase signal) in a two-phase (an A-phase and a B-phase) pulse signal from the reading encoder EN1 and the edge pulse in the memory 62 is updated in synchronization with the edge pulse. However, this is only an example, and the edge pulse may be outputted based on both of a rising edge and a falling edge of the A-phase (or the B-phase), or may be outputted based on both of rising edges and falling edges of the A-phase and the B-phase.

In addition, while the reading encoder MT1 and the reading conveyance encoder EN2 are rotary encoders in the above-described embodiments, these encoders may be linear encoders.

In the above embodiments, description is made of a case where the present invention is applied to the drive control of the reading motor MT1 (and thus the drive control of the carriage 106) in the image reading apparatus 100. However, the drive control of the above-mentioned reading conveyance motor which constitutes the ADF apparatus 150 may be performed in a same manner as in the above embodiments, and thus the present invention may also be applied in this case.

Furthermore, the present invention may be applied not only to the drive control in the image reading apparatus 100 but also to the drive control of a carriage (not shown, provided for mounting thereon a recording head (not shown)) constituting the image forming apparatus 200.

In other words, the present invention may be applied to any apparatus that includes a device, such as an encoder, which outputs a detection signal each time a driven object is driven by a specified amount, detects a driven velocity of the driven object based on the detected signal, and performs drive control of a motor such that the driven velocity is equal to a target velocity.

What is claimed is:

1. A motor control method comprising the steps of:
    measuring a time period from an output of a drive detection signal to a next output of a drive detection signal each time a drive detection signal is outputted from a drive detection device that outputs a drive detection signal each time a driven object is driven by a motor by a specified amount;
    storing the measurement result at the each time of output of a drive detection signal as a measured cycle each time a drive detection signal is outputted from the drive detection device;
    calculating a driven velocity of the driven object based on the stored measured cycle;
    calculating an operation amount of the motor such that the calculated driven velocity is equal to a predetermined target velocity at each calculation timing in a predetermined cycle; and
    drive-controlling the motor based on the calculation result of the operation amount,
    wherein it is determined, at the each calculation timing, whether or not the driven object is in a low velocity state where an actual velocity is lower than the target velocity, and when it is determined that the driven object is in the low velocity state, calculation of the driven velocity of the driven object is performed based on a measured value being currently measured at the calculation timing in place of the stored measured cycle.

2. The motor control method according to claim 1, wherein the determination on whether or not the driven object is in the low velocity state at the each calculation timing is performed by comparing the measured value being currently measured at the each calculation timing with a target cycle as the measurement result obtained when the driven object is driven at the target speed, and it is determined that the driven object is in the low velocity state when the measured value being currently measured is greater than the target cycle.

3. A motor control apparatus comprising:
    a drive detection device that outputs a drive detection signal each time a driven object is driven by a specified amount by a motor;
    a measurement device that measures a time period from an output of the drive detection signal to a next output of a drive detection signal;
    a measured cycle storage device that stores a measurement result by the measurement device as a measured cycle each time the drive detection signal is outputted from the drive detection device;
    a detection cycle output device that outputs the measured cycle stored by the measured cycle storage device as a detection cycle at each calculation timing in a predetermined cycle;
    a velocity calculation device that calculates a driven velocity of the driven object based on the detection cycle outputted from the detection cycle output device;
    a drive control device that calculates an operation amount of the motor such that the driven velocity calculated by the velocity calculation device is equal to a predetermined target velocity at the each calculation timing and controls the drive of the motor based on the calculation result; and
    a low velocity state determination device that determines, at the each calculation timing, whether or not the driven object is in a low velocity state where an actual velocity of the driven object is lower than the target velocity,
    wherein when it is determined by the low velocity state determination device that the driven object is in the low velocity state at the each calculation timing, the detection cycle output device outputs, as the detection cycle, a measured value measured by the measurement device at the calculation timing in place of the measured value stored in the measured cycle storage device.

4. The motor control apparatus according to claim 3, wherein the low velocity state determination device compares an actual measured value measured by the measurement device at the each calculation timing with a specified determination criterion cycle equal to or more than a target cycle which is a measured value obtained by the measurement device when the driven object is driven at the target velocity, and determines that the driven object is in the low velocity state when the actual measured value is greater than the determination criterion cycle.

5. The motor control apparatus according to claim 4,
wherein the motor control apparatus is configured to detect an abnormality when the measured value being currently measured by the measurement device exceeds a predetermined upper limit measured value, and
wherein the determination criterion cycle is a value predetermined within a range equal to or more than the target cycle and equal to or less than the upper limit measured value.

6. The motor control apparatus according to claim 4,
wherein the drive control device is configured to drive-control the motor such that the driven velocity does not exceed a predetermined velocity variable range including the target velocity, and
wherein the determination criterion cycle is a value predetermined within a range equal to or more than the target cycle and equal to or less than a measured value obtained by the measurement device when the driven object is driven at a lower limit velocity within the predetermined velocity variable range.

7. The motor control apparatus according to claim 4, wherein the determination criterion cycle is the target cycle.

8. The motor control apparatus according to claim 3,
wherein the cycle of the calculation timing is set to be equal to or more than the target cycle target cycle which is a measured value obtained by the measurement device when the driven object is driven at the target velocity, and
wherein the low velocity state determination device compares, at the each calculation timing, a measured cycle stored in the measured cycle storage device at the previous calculation timing with a measured cycle stored in the measured cycle storage device at the current calculation timing, and determines that the driven object is in the low velocity state when the both measured cycles are equal.

9. The motor control apparatus according to claim 3,
wherein the cycle of the calculation timing is set to be equal to or more than the target cycle which is a measured value obtained by the measurement device when the driven object is driven at the target velocity, and
wherein the low velocity state determination device determines, at the each calculation timing, whether or not the drive detection signal is outputted from the drive detection device during a time period from the previous calculation timing until the current calculation timing, and determines that the driven object is in the low velocity state when the drive detection signal is not outputted.

10. The motor control apparatus according to claim 3,
wherein the cycle of the calculation timing is set to be equal to or more than the target cycle which is a measured value obtained by the measurement device when the driven object is driven at the target velocity, and
wherein the low velocity state determination device compares, at the each calculation timing, an actual measured value by the measurement device at the calculation timing with the cycle of the calculation timing, and determines that the driven object is in the low velocity state when the actual measured value is greater than the cycle of the calculation timing.

* * * * *